(12) United States Patent
Nomura et al.

(10) Patent No.: US 11,449,629 B2
(45) Date of Patent: Sep. 20, 2022

(54) DATA TRANSFER MANAGEMENT SYSTEM AND DATA TRANSFER MANAGEMENT METHOD

(71) Applicant: HITACHI, LTD., Tokyo (JP)

(72) Inventors: Ken Nomura, Tokyo (JP); Mitsuo Hayasaka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 418 days.

(21) Appl. No.: 16/561,873

(22) Filed: Sep. 5, 2019

(65) Prior Publication Data

US 2020/0175195 A1 Jun. 4, 2020

(30) Foreign Application Priority Data

Nov. 29, 2018 (JP) .............................. JP2018-223423

(51) Int. Cl.
*G06F 21/62* (2013.01)
*H04L 67/1097* (2022.01)
*H04B 1/3827* (2015.01)
*H04L 61/2503* (2022.01)

(52) U.S. Cl.
CPC ...... *G06F 21/6245* (2013.01); *H04L 67/1097* (2013.01); *G06F 2221/2101* (2013.01); *G06F 2221/2111* (2013.01); *H04B 1/3827* (2013.01); *H04L 61/2503* (2013.01)

(58) Field of Classification Search
CPC .................................................. G06F 21/6245
See application file for complete search history.

(56) References Cited

U.S. PATENT DOCUMENTS

| 8,140,346 | B2 | 3/2012 | Kaplan | |
|---|---|---|---|---|
| 2015/0019254 | A1* | 1/2015 | Ibikunle | G06F 21/6245 705/3 |
| 2017/0289169 | A1* | 10/2017 | Plichta | H04L 63/102 |
| 2018/0124066 | A1* | 5/2018 | Minkovich | H04L 9/3297 |

* cited by examiner

*Primary Examiner* — Esther B. Henderson
(74) *Attorney, Agent, or Firm* — Volpe Koenig

(57) ABSTRACT

Appropriate management of transfer of data generated in real time from an area where handling of data is regulated to the outside is enabled. A storage computer manages transfer of data from a transfer source belonging to an environment where handling of data is regulated to an external transfer destination. Data to be transferred is sequential transfer data sequentially transferred to the outside when the data is not wholly present in the environment. The storage computer includes a memory storing information and CPU connected to the memory and capable of performing predetermined processing. Permissibility of transfer of the data to be transferred to a transfer destination is determined by the CPU based on: personal information included in a data source on which the data to be transferred is based; contents of processing performed on the data source; and an execution result of the processing on the data source.

10 Claims, 25 Drawing Sheets

| ID | CONNECTED TO | CONNECTING PROTOCOL (PROCESSING PROGRAM) | SIGNAL TYPE (OUTPUT TYPE) | LEGAL REGULATION-RELATED INFORMATION | |
|---|---|---|---|---|---|
| S000 | 10.0.2.1:80 | HTTP (connect1.sh) | Video:mp4 (IO001) | CONTENTS OF SIGNAL:<br>P019 : (VEHICLE NUMBER)<br>P001 : (PERSON)<br>P999 : (OTHERS) | 511 |
| S001 | 10.0.2.2:1883 | MQTT (connect2.sh) | CSV TEXT (IO010) | NONE | 512 |
| S002 | 10.0.2.3:22 | SSH (connect3.sh) | CAPSULATION (IO999) | DEPENDING ON CONTENTS | 513 |
| ... | ... | ... | ... | ... | |

| ID | PROCESSING NAME (PROCESSING PROGRAM) | INPUT TYPE LIST | OUTPUT TYPE LIST | LEGAL REGULATION-RELATED INFORMATION | |
|---|---|---|---|---|---|
| T100 | COMPRESSION (comp1.sh) | BINARY (IO008) | BINARY (IO008) | FEATURES OF PROCESSING<br>TP001 : ALL PASSED | 531 |
| T101 | PERSON EXTRACTION (opencv1.sh) | Video : mp4,avi (IO001,IO002) | Video : mp4 (IO001) | FEATURES OF PROCESSING<br>TP005 : PERSON IMAGE PASSED | 532 |
| T102 | PII MASKING (opencv2.sh) | CSV TEXT (IO009) | CSV TEXT (IO009) | FEATURES OF PROCESSING<br>TN002 : PII INFORMATION DELETED | 533 |
| ... | ... | ... | ... | ... | |

| ID 601 | EXPORTING SOURCE 602 | DESTINATION FOR EXPORT 603 | EXPORTED ARTICLE AND COMPLIANCE STATUS 604 | EXPORT PERMISSIBILITY 605 |
|---|---|---|---|---|
| R6000 | (EU) 10.0.* | (USA) 10.1.3.5 10.1.3.6:80 | EXPORTED ARTICLE : PERSONAL INFORMATION-PERSON (P001)<br>EXPORTING SOURCE-CONTRACT A : VALID (20300502–)<br>STATUTE TYPE : J0001 | OK  611 |
| R6001 | (JAPAN) 10.2.* | (USA COMPANY) *.abcd.co.jp | EXPORTED ARTICLE : PERSONAL INFORMATION-PERSON (P001)<br>EXPORTING SOURCE-CONTRACT B : VALID (20300502–)<br>STATUTE TYPE : J0002 | OK  612 |
| R6002 | (JAPAN) 10.2.* | (USA) 10.1.* | EXPORTED ARTICLE : PERSONAL INFORMATION-PERSON (P001)<br>EXPORTING SOURCE-CONTRACT C : VALID (20180101–20300502)<br>STATUTE TYPE:J0003<br>EXPORTING SOURCE-CONTRACT D : VALID (20180101–20100801)<br>STATUTE TYPE : J0004<br>APPOINTMENT OF DPO : VALID (20180101–)<br>SELF-REGULATION E : VALID (20200910–)<br>STATUTE TYPE : J0999 | NG  613 |
| ... | ... | ... | ... | ... |

| ID | STATUS | NODE TYPE | CONTENTS OF NODE PROCESSING | PRECEDING NODE | SUBSEQUENT NODE | |
|---|---|---|---|---|---|---|
| F000 | START POINT | 381 : INPUT SIGNAL | S000 : Video (mp4) | | F001 | ~711 |
| F001 | RELAY | 382 : PREPROCESSING | T100 : COMPRESSION | F001 | F002 | ~712 |
| F002 | RELAY | 384 : DATA MIGRATION | R6000 : EU→USA | F002 | F003 | ~713 |
| F003 | END POINT | 383 : POSTPROCESSING | T101 : PERSON EXTRACTION | F003 | | ~714 |
| F004 | UNUSED | | | | | |
| F005 | START POINT | 381 : INPUT SIGNAL | DEFAULT | | F007 | ~715 |
| F006 | START POINT | 381 : INPUT SIGNAL | DEFAULT | | F007 | ~716 |
| F007 | RELAY | 382 : PREPROCESSING | DEFAULT | F005 F006 | F008 | ~717 |
| F008 | END POINT | 382 : PREPROCESSING | DEFAULT | F007 | | ~718 |
| ... | ... | ... | ... | ... | ... | |

| ID | STATUS | FLOW NAME | START NODE | |
|---|---|---|---|---|
| B000 | EXECUTING | MONITORING PROCESSING | F000 | ~741 |
| B001 | STOP | 3D IMAGE CREATING PROCESSING | F005,F006 | ~742 |
| ... | ... | ... | ... | |

| ID | DATE AND TIME | FLOW ID | NODE ID | NODE TYPE | STATUS OF EXPORT | PROCESSING RESULT | |
|---|---|---|---|---|---|---|---|
| L0000 | 2018/10/5 17:23:12 (GMT+09:00) | B000 | F000 | DATA INPUT (START POINT) | EXPORTED ARTICLE AND COMPLIANCE STATUS : NONE ― ― ― | ERROR (RECEPTION FAILED) | 911 |
| L0001 | 2018/10/5 18:05:00 (GMT+09:00) | B000 | F002 | DATA MIGRATION | EXPORTED ARTICLE AND COMPLIANCE STATUS : P001, R6000 EXPORT PERMISSIBILITY: PERMISSIBLE | NORMAL TERMINATION | 912 |
| L0002 | 2018/10/6 19:23:12 (GMT+09:00) | B000 | F003 | DATA PROCESSING (END POINT) | EXPORTED ARTICLE AND COMPLIANCE STATUS : P001, R6000 EXPORT PERMISSIBILITY: PERMISSIBLE | NORMAL TERMINATION (PERSONAL INFORMATION DELETED AFTER EXPORT) | 913 |
| ... | ... | ... | ... | ... | ... | ... | |

| ID | SETTING ITEM | VALUE | |
|---|---|---|---|
| C000 | REGION OF INSTALLATION : COUNTRY (COORDINATES) | JAPAN : TOKYO (35.68138/139.76608) | 931 |
| C001 | HOST NAME | HOST001 (HOST001.abcd.co.jp) | 932 |
| C002 | IP ADDRESS | 10.0.2.5/24 192.168.1.1/24 | 933 |
| C003 | default gateway | 10.0.2.1 | 934 |
| C004 | DNS SERVER | 20.0.0.1 | 935 |
| ... | ... | ... | |

FIG. 15

| ID | VALUE | |
|---|---|---|
| IO001 | Video (mp4) | ~1051 |
| IO002 | Video (avi) | ~1052 |
| ... | ... | |
| IO008 | BINARY | ~1053 |
| IO009 | TEXT (CSV) | ~1054 |
| ... | ... | |

| ID | SPECIFIED BY STATUTE | CHECK SCRIPT PROGRAM | |
|---|---|---|---|
| J0001 | CONTRACT A AT EXPORTING SOURCE | /check/a.sh | ~1071 |
| J0003 | CONTRACT C AT DESTINATION FOR EXPORT | /check/b.sh | ~1072 |
| ... | ... | ... | |
| J0998 | APPOINTMENT OF DPO | /check/d.sh | ~1073 |
| J0999 | SELF-REGULATION E | /check/e.sh | ~1074 |
| ... | ... | ... | |

| ID | GEO-FENCE/ DOMAIN | REGIONAL NAME/ COUNTRY NAME (ISO CODE) | PRIORITY | ALLOCATED ADDRESS | OTHER COMPLEMENTARY INFORMATION | |
|---|---|---|---|---|---|---|
| M001 | *.xyz.go.jp (53.002,14.311), | ADMINISTRATIVE ORGAN OF JAPAN (ex0001) | 10 | 20.2.3.* | xyz (ADMINISTRATIVE ORGAN) | ~2311 |
| ... | ... | ... | ... | ... | ... | |
| D001 | *.abcd.co.jp | JAPAN (392) | 20 | 10.2.5.* | Abcd CORPORATION (JAPANESE BRANCH OFFICE) | ~2312 |
| ... | ... | ... | ... | ... | ... | |
| G000 | (53.002,14.311), (52.001,13.310), : | EU : GERMANY (276) | 30 | 10.0.0.1 | STORAGE DEVICE A | ~2313 |
| | | | | 10.0.1.2 | STORAGE DEVICE B | ~2314 |
| | | | | ... | ... | |
| ... | ... | ... | ... | ... | ... | |
| G999 | OTHERS | ERROR | 999 | ERROR | CONTACT DETAILS INFORMATION | ~2315 |

2301  2302  2303  2304  2305  2306

393

DATA TRANSFER MANAGEMENT SYSTEM AND DATA TRANSFER MANAGEMENT METHOD

BACKGROUND

The present invention relates to a technology for managing data transfer from an environment where handling of data transfer is regulated to the outside.

In Japan, the Personal Information Protection Law was revised in May, 2017. The operation of the EU GDPR (General Data Protection Regulation) was started overseas in May, 2018. Both the law and the regulation limit migration of personal information and information related to human rights from an area where such a regulation or law is applied to an outside area. Such information as personal information is also referred to as PII (Personally Identifiable Information). PII includes information such as address, name, passport number, and face photograph and information (individual identification code) obtained by coding bio-information, such as fingerprints, for computer processing. Further, PII includes personal information requiring care, such as race, creed, medical history, and criminal record. PII is to be protected by many laws and regulations differing from jurisdiction to jurisdiction or the like, including Law for the Protection of Personal Data Held by Administrative Organs, Law for the Protection of Personal Information Retained by Independent Administrative Institutions, and privacy protection ordinances laid down by local governments. For handling of PII, each statute requires prescribed thorough compliance by making an agreement beforehand, appointing a person in charge, recording the details of data migration, or taking other like measures. There is need for a technology for such thorough compliance.

Meanwhile, on globally deployed cloud services, such functions as large-scale data analysis platforms, unique AI functions, and quantum computers, are available. To utilize a function provided only on an overseas cloud, data migration astride different legal environments is indispensable. For example, to analyze data including personal information, such as a list of names, on an overseas cloud, export procedures are required.

However, for some data to be analyzed, such a fixed object of export as a list of names may be not statically present beforehand. For example, in an analysis of stream data, such as monitoring camera images or sensor data, continuous data generated in real time is migrated between different legal environments. For such data migration, whether to export personal information or the like varies, for example, between cases where a person is embraced in video data and cases where any person is not embraced. That is, when such data is migrated, consideration must be given not only to that the legal nature of the data is not determined beforehand but also to that the legal nature of the data is continuously varied.

For example, in a technique called virtualization of data, processed data is not generated beforehand or held but multiple pieces of original data as material are acquired on demand and composed into processed data in real time. This brings about an advantage that processed data using the latest original data can be obtained. In cases where such virtualized data is transferred astride different legal environments, an object of export is not determined until data is actually accessed.

U.S. Pat. No. 8,140,346 describes a technology for checking for any legal problem prior to execution of transaction for export. Specifically, in the technology described in U.S. Pat. No. 8,140,346, relation information, including the contents of transaction, a target country, and the type of a commodity transferred, is transmitted to a legal integrator service. The legal integrator service then checks for any legal problem. When there is some problem, the legal integrator service replies and presents a compliance statement to a user and stops the execution of the transaction.

SUMMARY

When an attempt is made to apply the technology described in U.S. Pat. No. 8,140,346, for example, to an analysis of stream data astride different legal environments, the following problems arise:

Since data as an object of export and related information do not exist beforehand, any legal problem cannot be statically checked for and the technology described in U.S. Pat. No. 8,140,346 cannot be applied. Especially, in cases where the presence of a legal problem is determined after export, for example, by extracting a person from an image at a destination for export, any legal problem cannot be checked for beforehand and the technology described in U.S. Pat. No. 8,140,346 cannot be applied.

Also, in cases where an attempt is made to record export in compliance with a statute, a problem arises. Since an object of export is not present beforehand, a record cannot be made by a method of recording an object of export itself, for example, recording a name of a file into which data is stored. When a record of export cannot be made, a report of the status of export to a person in charge of data protection, required by statute, cannot be made, either.

Stream data could be simply divided immediately before data migration, the divided data be stored into files, and the technology described in U.S. Pat. No. 8,140,346 be applied to each file. In this case, at least the following problems arise: First, a storage capacity sufficient to store increased files of an object of export. Second, performance of processing stream data is degraded because of input/output processing for generating files of an object of export. Third, to check for any legal problem by the technology described in U.S. Pat. No. 8,140,346, related information, such as the contents of files of an object of export, must be separately generated as well.

These problems arise not only in data transfer between areas different in legal environment. These problems arise also in cases where a check is made about whether data transfer complies with a rule between entities (for example, between organizations, such as companies, organs, and groups) different in data handling.

The present invention is made in consideration of the above-mentioned circumstances and it is an object of the present invention to provide a technology that allows transfer of data generated in real time from an area where data handling is regulated to the outside to be appropriately managed.

To achieve the above object, a data transfer management system according to an aspect of the present invention is a data transfer management system that manages data transfer from a transfer source belonging to an environment where data handling is regulated to an external transfer destination. Data to be transferred is sequential transfer data sequentially transferred to the outside when the data is not wholly present in the environment. The data transfer management system includes: a storage portion storing information and a processor portion connected to the storage portion and capable of executing predetermined processing. The processor portion determines whether to permit transfer of data to be transferred to a transfer destination based on: personal information included in a data source on which the data to be transferred is based; the contents of processing executed on the data source; and a result of the execution of the processing on the data source.

According to the present invention, transfer of data generated in real time from an area where data handling is regulated to the outside can be appropriately managed.

BRIEF DESCRIPTION OF THE DRAWINGS

FIG. 5 is a detailed composition diagram of an input signal management table according to an embodiment;

FIG. 6 is a detailed composition diagram of a data processing content management table according to an embodiment;

FIG. 7 is a detailed composition diagram of a compliance status management table according to an embodiment;

FIG. 8 is a composition diagram of a flow definition management table according to an embodiment;

FIG. 9 is a detailed composition diagram of a flow management table according to an embodiment;

FIG. 11 is a detailed composition diagram of a flow execution result recording table according to an embodiment;

FIG. 12 is a detailed composition diagram of a basic setting table according to an embodiment;

FIG. 15 is a detailed composition diagram of an input/output type table according to an embodiment;

FIG. 16 is a detailed composition diagram of a statute type table according to an embodiment;

FIG. 30 is a detailed composition diagram of a geo-fence/domain management table according to an embodiment.

DETAILED DESCRIPTION

A description will be given to embodiments of the present invention with refer to the drawings. The embodiments described below do not limit the invention according to the claims and elements described in relation to the embodiments and combinations of such elements are not all indispensable to the means for solving the problems according to the present invention.

In the following description, information may be described by an expression of "AAA table"; however, information may be represented by any data structure. That is, a "AAA table" can be designated as "AAA information" in order to indicate that information does not depend on a data structure.

In the following description, a "processor portion" includes one or more processors. At least one processor is typically a microprocessor such as CPU (Central Processing Unit). Each of one or more processors may be of single core or may be of multicore. Each processor may include a hardware circuit that performs part or all of processing.

In the following description, a "storage portion" includes one or more memories. With respect to the storage portion, at least one memory may be a volatile memory. The storage portion is used mainly in processing by the processor portion. The storage portion may further include one or more nonvolatile storage devices (for example, HDD (Hard Disk Drive) or SSD (Solid State Drive)).

In the following description, a "program" may be taken as an operation subject. However, when executed by the processor portion, a program performs predetermined processing using at least one of the storage portion and an interface portion as appropriate; therefore, an operation subject of processing may be the processor portion (or a computer or a computer system including the processor portion). A program may be installed from a program source into a computer. A program source may be, for example, a program distribution server or a computer-readable nonvolatile recording medium. In the following description, two or more programs may be implemented as a single program and a single program may be implemented as two or more programs.

First, a description will be given to a computer system according to an embodiment.

Figure 1:
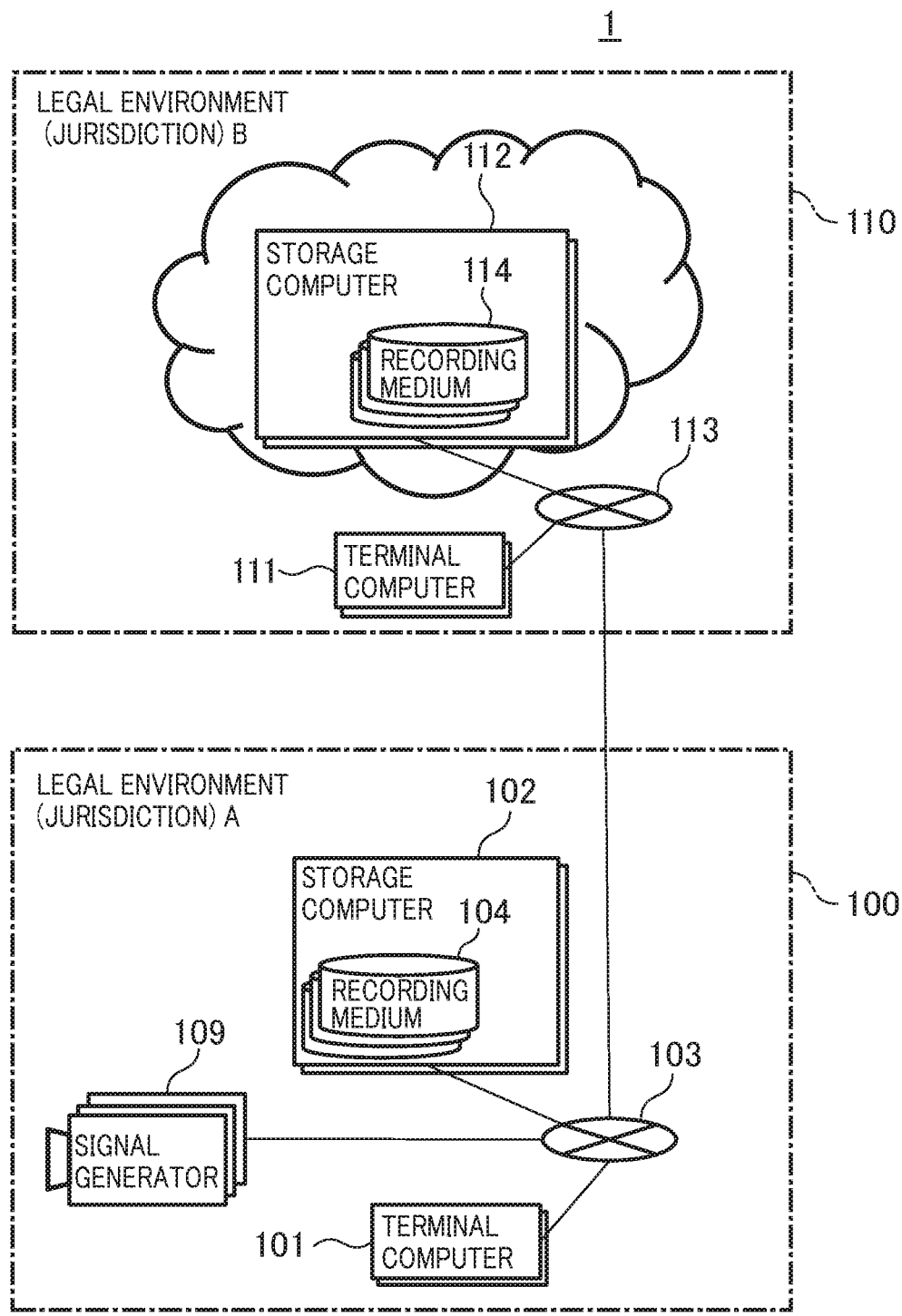
FIG. 1 is a drawing illustrating an exemplary configuration of a computer system according to an embodiment.

FIG. 1 illustrates an exemplary configuration of the computer system according to an embodiment.

In the computer system 1, a system of a legal environment (jurisdiction) 100 (also referred to as legal environment A) and a system of a legal environment (jurisdiction) 110 (also referred to as legal environment B) are configured via a network 103 and a network 113. The legal environment 100 and the legal environment 110 are areas, for example, where different statutes are applied to transfer of data including personal information.

In the legal environment 100, one or more terminal computers 101, a storage computer 102 as an example of a transfer management device, and a signal generator 109 are connected with one another via the network 103. The storage computer 102 is provided therein with a recording medium 104 capable of recording signal data generated by the signal generator 109, data obtained by processing this signal data, and metadata related to all of these pieces of data. The data transfer management system is comprised of the storage computer 102 and the terminal computer 101. When functions required for the data transfer management system are limited, the data transfer management system may be comprised of only the storage computer 102.

In the legal environment 110, one or more terminal computers 111 and a storage computer 112 are connected with each other via the network 113. The storage computer 112 is provided therein with a recording medium 114 capable of recording signal data sent from the storage computer 102, data obtained by processing this signal data, and metadata related to all of these pieces of data.

For example, data (stream data; also referred to as signal data) continuously generated by the signal generator 109 in real time is transferred (exported) from the legal environment A to the legal environment B by the storage computer 102. Stream data cited here is an example of sequential transfer data sequentially transferred to the outside with the whole of the data not present in the storage computer 102.

The storage computer 102 (112) has functions of a storage storing static data, such as files and records of a database, on the recording medium 104 (114). In addition, the storage computer 102 (112) is capable of holding dynamic data, such as stream data, on memory or the recording medium 104 (114) and also has a function of transferring data to other equipment as required and discarding data in order of age. The storage computer 102 (112) further has a function of holding metadata for managing both static data and such dynamic data as stream data on the recording medium 104 (114).

For the signal generator 109, a computer similar to the terminal computer 111 and the storage computer 102 itself as well as apparatuses, such as a video camera, a mobile terminal, a sensor, and other measuring instruments, may be adopted. For example, the storage computer 102 in the legal environment (jurisdiction) A as an exporting source of data can be a kind of a signal generator as viewed from the storage computer 112 located in the legal environment (jurisdiction) B as a destination for export of data.

In the example shown in FIG. 1, the storage computer 102 (112) and the terminal computer 101 (111) are differently configured. Instead, the terminal computer 101 (111) and the storage computer 102 (112) may be so configured as to operate on an identical computer. The terminal computer 101 (111) and storage computer 102 (112) in FIG. 1 may a physical computer as a so-called bare metal or may be a virtual computer called VM (Virtual Machine).

A description will be given to a hardware configuration of computers, such as the storage computer 102 (112) and the terminal computer 101 (111).

Figure 2:
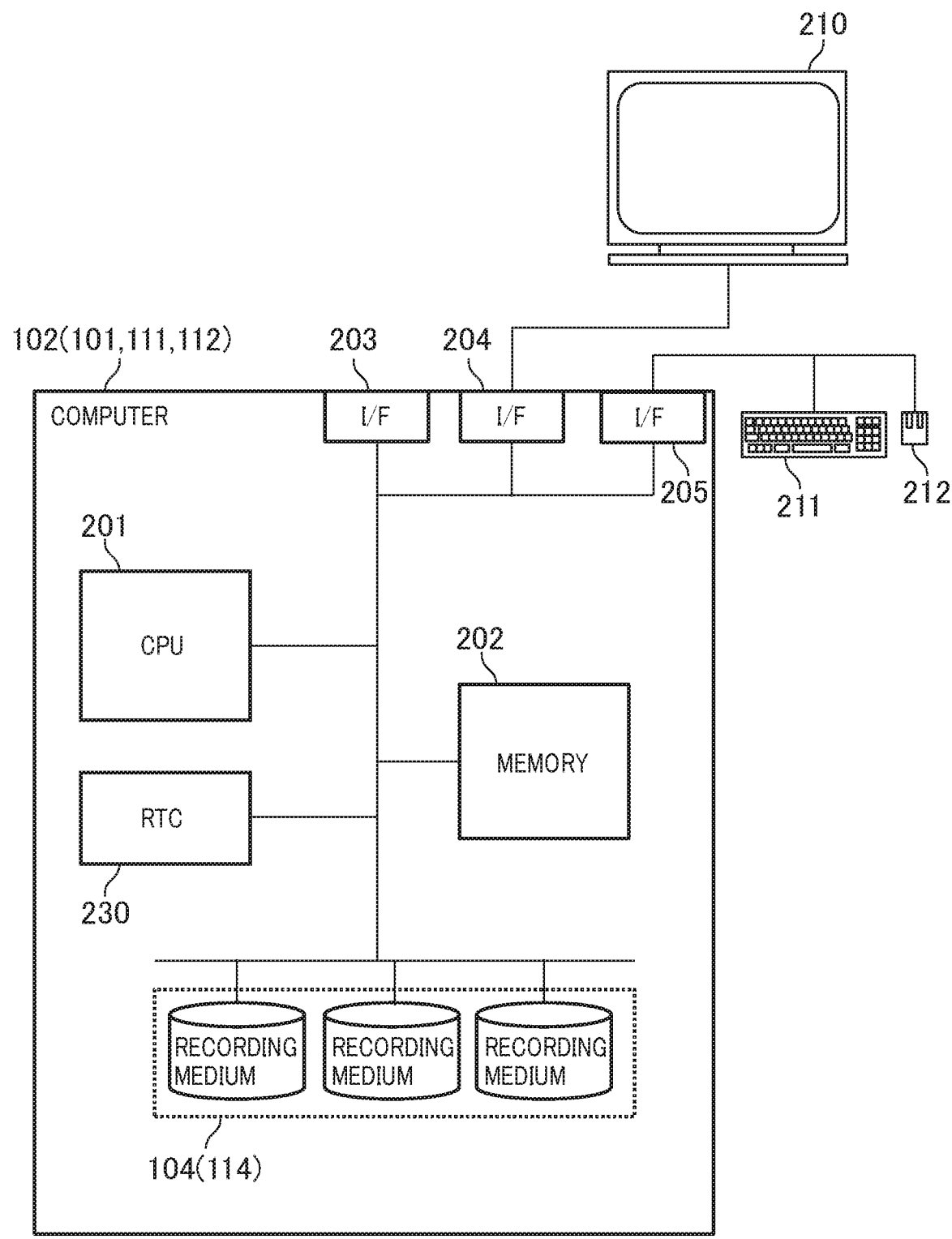
FIG. 2 is a hardware block diagram of a computer according to an embodiment.

FIG. 2 is a hardware block diagram of a computer according to an embodiment.

The storage computer 102 installed in the legal environment (jurisdiction) A and the storage computer 112 installed in the legal environment (jurisdiction) B are identical with each other in basic configuration. The terminal computers 101, 110 can also be provided with a hardware configuration similar to the storage computer 102. The signal generator 109 may also be provided with the similar hardware configuration.

The storage computer 102 (112) includes CPU 201 as an example of the processor portion, a memory 202 as an example of the storage portion, an interface 203, 204, 205, the recording medium 104 (114), and RTC (Real Time Clock) 230. These components are connected with one another via an internal bus or an external bus.

The CPU 201 executes a program stored in the memory 202 and/or the recording medium 104 to perform varied processing.

The memory 202 is, for example, RAM (Random. Access Memory) and stores a program executed at the CPU 201 and required information (a table and the like).

The interface 203 is NIC (Network Interface Card) for connection to the network 103 (113). The interface 204 is a display port for connection to a display 210. The interface 205 is USB (Universal Serial Bus) for connection to a keyboard 211 and a mouse 212. An interface, such as VGA (Video Graphics Array) for connection to the display 210, based on a different standard from the foregoing, and an interface, such as HBA (Host Bus Adapter), for connection to an external recording medium may be added to the storage computer 102. Any externally connected recording medium, such as a USB memory, can be utilized from a program on the memory 202 by connecting the USB memory via the USB interface 205 similarly to the keyboard 211 and the mouse 212 and acquiring binary data including a table and a program in the USB memory.

The recording medium 104 (114) is a physical drive, such as SAS (Serial Attached SCSI) and SATA (Serial ATA), for example. The recording medium 104 may be used to configure a logical drive, such as LVM (Logical Volume Manager) or a structured data store or a semi-structured data store, such as RDBMS (Relational DataBase Management System) and NoSQL (Not only SQL).

The RTC 230 is hardware that outputs the current time. Software executed at the CPU 201 can acquire the current time from the RTC 230.

A description will be given to a configuration of the memory 202 of the storage computer 102 (112).

Figure 3:
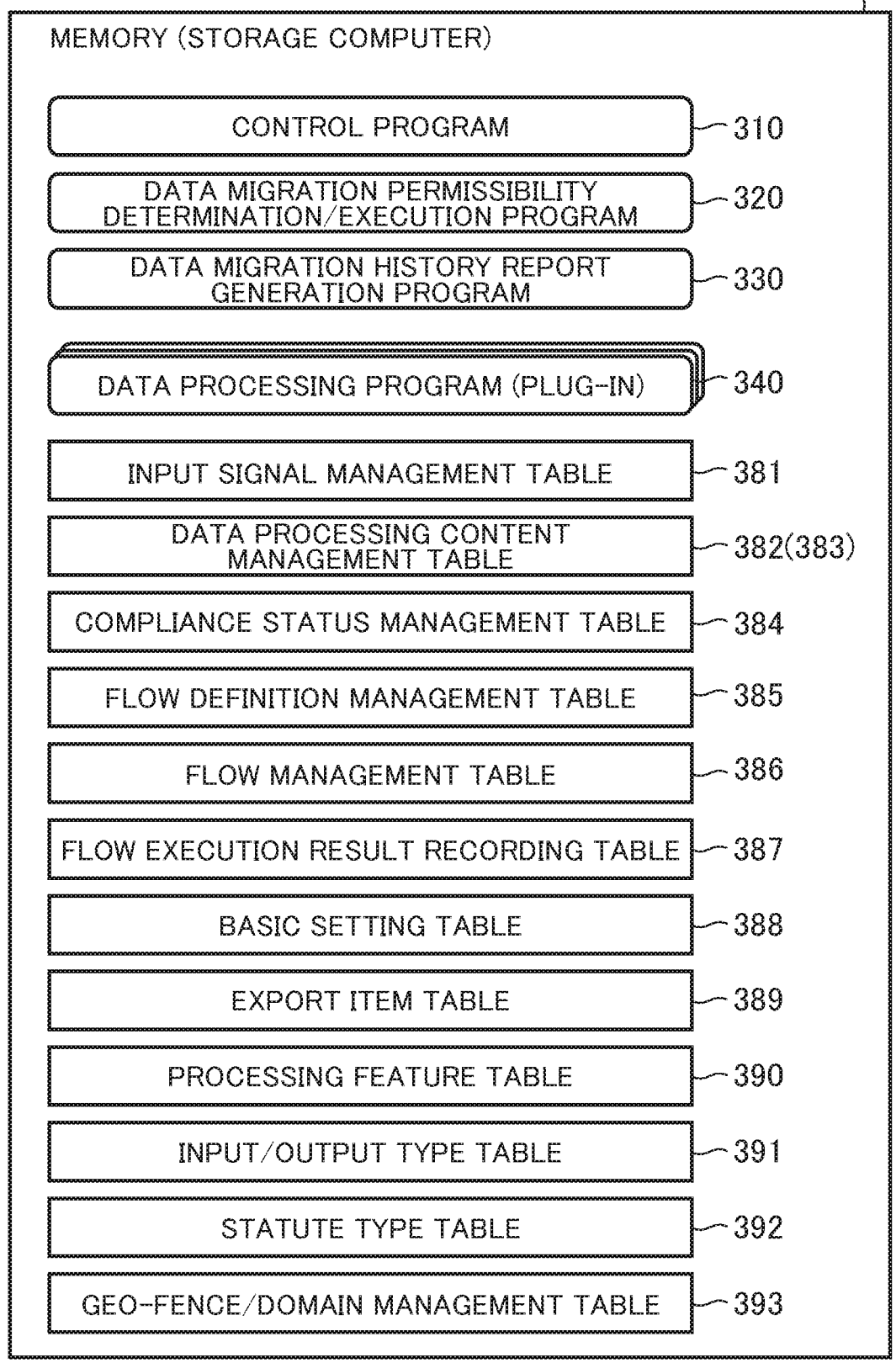
FIG. 3 is a block diagram of memory of a storage computer according to an embodiment.

FIG. 3 is a composition diagram of a memory of a storage computer according to an embodiment.

The memory 202 of the storage computer 102 (112) holds a control program 310, a data migration permissibility determination/execution program 320, a data migration history report generation program 330, and multiple data processing programs 340 added as plug-ins. The memory 202 further holds an input signal management table 381, a data processing content management table 382 (383 in the storage computer 112), a compliance status management table 384 as an example of compliance status management information, a flow definition management table 385, a flow management table 386, a flow execution result recording table 387, a basic setting table 388, an export item table 389, a processing feature table 390, an input/output type table 391, a statute type table 392, and a geo-fence/domain management table 393. Programs and tables, not shown, such as OS (Operating System) and BIOS (Basic Input/Output System), for implementing other services are also held in the memory 202. These programs and tables are stored also in the recording medium 104 (114) and read to the memory 202 when the storage computer 102 (112) is started.

In this embodiment, the storage computer 102 stores the data processing content management table 382 managing data processing performed before export of data to be transferred from the legal environment (jurisdiction) A to the legal environment (jurisdiction) B (before transfer) and the storage computer 112 stores the data processing content management table 383 managing data processing performed after export (after transfer). The data processing content management tables in the storage computer 102 and the storage computer 112 may be tables including identical contents, that is, tables managing both data processing performed before export and data processing performed after export. In cases where such management is conducted, the tables must be synchronized with each other such that when the data processing content management table in either of the storage computer 102 and the storage computer 112 is updated, the data processing content management table in the other is also updated. In this case, the tables may be synchronized with each other by an existing technology, such as a shared memory or a shared folder.

A description will be given to a configuration of the memory 202 of the terminal computer 101 (111).

Figure 4:
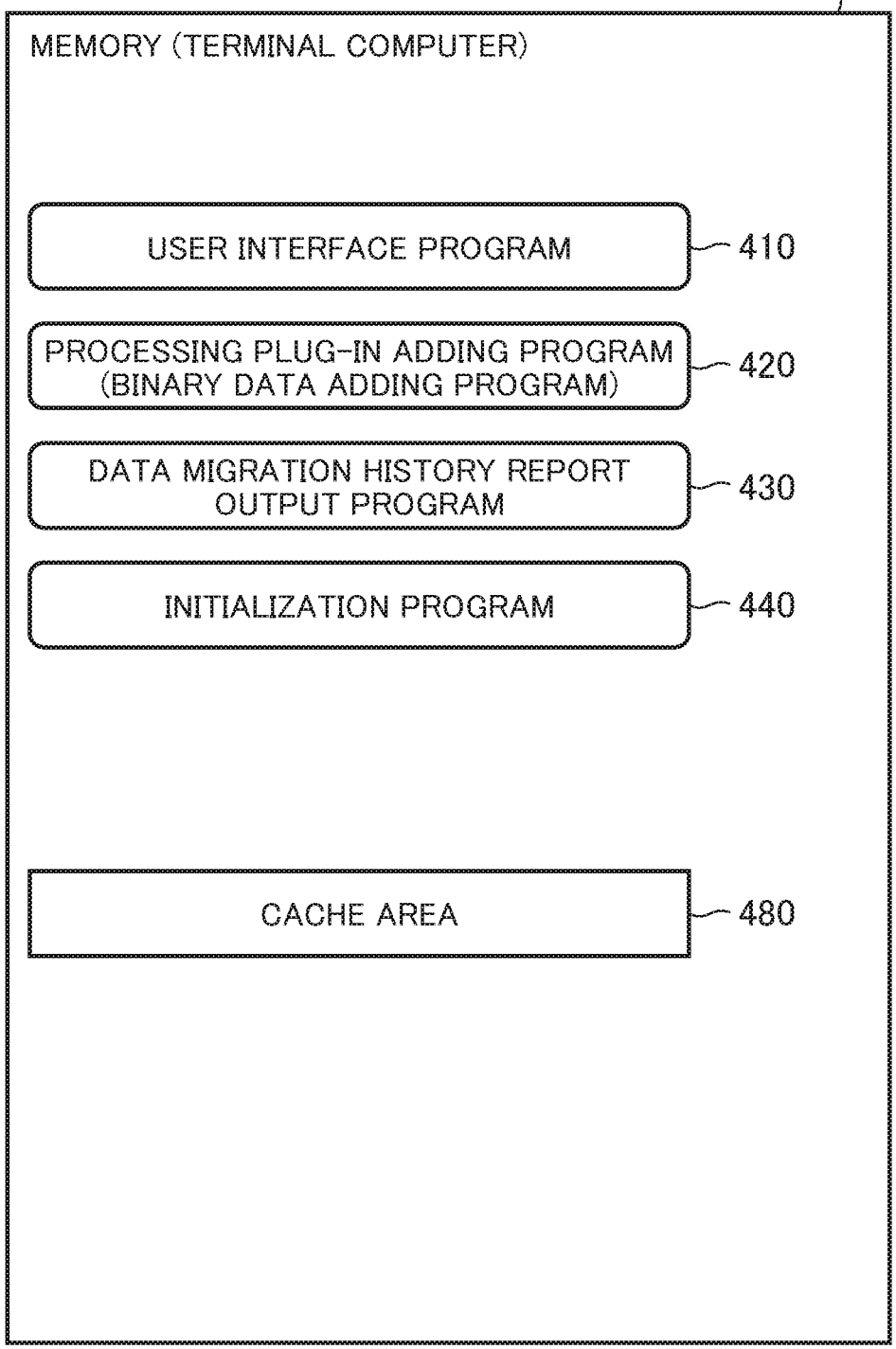
FIG. 4 is a block diagram of memory of a terminal computer according to an embodiment.

FIG. 4 is a block diagram of a memory of a terminal computer according to an embodiment.

The memory 202 of the terminal computer 101 (111) stores a user interface program 410, a processing plug-in adding program (binary data adding program) 420, a data migration history report output program 430, and an initialization program 440. The memory 202 further includes a cache area 480 for temporarily storing some or all of the contents of the various tables in the memory 202 of the storage computer 102 shown in FIG. 3 and other data. Programs and tables, not shown, such as OS and BIOS, for implementing other services are also stored in the memory 202. These programs and cache areas are stored also in the recording medium 104 and read to the memory 202 when the terminal computer 101 is started.

The programs and tables shown in FIG. 3 and FIG. 4 are read from the recording medium 104 onto memory 202 together with such basic software as OS by hardware and BIOS and when a program is executed by the CPU 201, a predetermined operation is implemented.

A detailed description will be given to each table stored in the memory 202.

FIG. 5 is a detailed composition diagram of an input signal management table according to an embodiment.

With respect to each of one or more signal generators 109, information about the signal generator 109 is placed row by row in the input signal management table 381.

The items of columns in each row corresponding to the signal generator 109 include ID (IDentification) 501, connected to 502, connecting protocol (processing program) 503, signal type (output type) 504, and legal regulation-related information 505.

In the column of ID 501, an identifier for identifying a signal generator 109 corresponding to each row is placed. In the column of connected to 502, information about a target of connection, such as IP (Internet Protocol) address, for connection to a signal generator 109 corresponding to each row is placed. In the column of connecting protocol (processing program) 503, a protocol and a program name used for connection to a signal generator 109 corresponding to each row are placed. In the column of signal type (output type) 504, a type (data type) of data generated (outputted) by a signal generator 109 corresponding to each row is indicated. In the column of legal regulation-related information 505, a type of legal regulation-related information that can be included in signal data generated by a signal generator 109 corresponding to each row is placed. An example of legal regulation-related information is information including personal information. Legal regulation-related information 505 includes an identifier indicating legal regulation-related information. Inclusion of a type of legal regulation-related information in legal regulation-related information 505 indicates that a statute must be adhered to.

The row 511 indicates that: mp4 video data is outputted as signal data by an HTTP (Hypertext Transfer Protocol) protocol and the signal data includes information, such as an image of a number plate of a vehicle and a person image, categorized as personal information.

The row 512 indicates that: CSV (Comma-Separated Values) text data is outputted as signal data by an MQTT (Message Queuing Telemetry Transport) protocol and this text data dose not include legal regulation-related information.

The row 513 is a row for which, for example, the storage computer 102 is registered as a signal generator. The row 513 indicates that some signal data is capsulated and outputted as signal data by an SSH (Secure Shell) protocol. As the result, what is in the capsulated signal data is obscured. Such capsulation is useful for cases where various types of signal data are communicated between storage computers and other like cases. The receiving side can restore capsulated information into original signal data by referring to added header information or taking other like measures.

Aside from the foregoing, a file placed in a shared folder opened to the public on a network, a page opened to the public on a Web server, and the like can also be registered as an input signal by adding a row whose access destination is set in the column of connected to 502. Here, information sources that can be handled as an input signal are also collectively referred to as data source. Data sources include a file stored in the storage computer 102 and the like. This data can also be registered as an input signal by adding a row for which a file path is set to the column of connected to 502. A file, such as virtualized data, whose contents are synthesized in real time may be taken as an input signal. For example, such information as order information may also be taken as an input signal. In this case, data migration can be performed with respect to order data by using an input signal to perform such data processing as inventory check and generating the order data based on a result of the data processing.

FIG. 6 is a detailed composition diagram of a data processing content management table according to an embodiment.

In the data processing content management table 382 (383), processing that can be performed on signal data (including data obtained after the signal data is processed) generated by the signal generator 109 at the storage computer 102 (112) is stored row by row. The processing includes varied processing, including processing of acquiring signal data from a signal generator, processing of compressing signal data, processing of extracting such specific data as a person image from signal data, processing of deleting personal information, such as a person image and a unique number of a mobile terminal, from signal data.

The items of columns in each row corresponding to each processing include ID 521, processing name (processing program) 522, an input type list 523, an output type list 524, and legal regulation-related information 525.

In the column of ID 521, an identifier for identifying processing corresponding to each row is placed. In the column of processing name (processing program) 522, a nickname of processing corresponding to each row and a name of processing program performing the processing are placed. Processing program placed in the column of processing name (processing program) 522 refers to one of data processing programs (plug-ins) 340 read from the recording medium 104 onto the memory 202. A data processing program 340 may be an independent program that can be executed as a command or may be a dedicated program, such as a driver, that does not operate by itself.

In the column of input type list 523, a type (input type) of signal data that can be inputted for processing corresponding to each row is placed. In the column of input type list 523, a list is placed when processing corresponding to each row corresponds to multiple pieces of signal data. In the column of output type list 524, a type (output type) of signal data outputted by processing corresponding to each row is placed. In the column of output type list 524, a list is placed when processing corresponding to each row corresponds to multiple pieces of signal data. In the column of legal regulation-related information 525, detailed contents of processing indicating how information required by statute is processed by processing corresponding to each row are placed. In the column of legal regulation-related information 525, features of processing are placed. Examples of such features of processing include: "any signal data is unchanged in nature from a viewpoint of legal regulation and is all passed," "in case of processing of deleting personal information, information related to legal regulation is all deleted and legal regulation is not applied to signal data." Features of processing are placed, for example, as an identifier indicating the features of processing.

In the data processing content management table 382 (383), an input type and an output type corresponding to processing are held. Therefore, the data processing content management table makes it possible, for example, to grasp which processing is applicable to different pieces of signal data generated by different signal generators and further easily couple processes whose output type and input type agree with each other. As a result, multiple processes can be easily performed in multiple stages.

The row 531 indicates processing of, when binary data is inputted, outputting compressed binary data. The row 531 indicates that a name of this processing is compression and a name of a program performing this processing is comp1.sh. The row 531 indicates that the processing is processing whose legal regulation-related information is identifier "TP001," that is, processing having a feature of "all passed" in which data does not differ in legal meaning at all before and after the processing. The contents of identifier "TP001" can be grasped by referring to the processing feature table 390.

The compression processing is implemented by a method of reading an existing compression command of open source, such as gzip, as a data processing program (plug-in) 340 or a method of originally creating a similar program. An argument given to a gzip command can be freely set by wrapping this command by a script or including the argument as part of a program name and placing the argument in the column of processing name (processing program) 522.

The row 532 indicates processing of, when video data is inputted, outputting video data with only a person portion extracted. The row 532 indicates that a name of the processing is person extraction and a name of a program performing this processing is opencv1.sh. The row 532 indicates that the processing is processing whose legal regulation-related information is identifier "TP005," that is, processing having a feature of "person image passed" in which information of person image categorized as personal information by statute is passed between before and after the processing. The processing of person extraction is implemented by a method of reading an existing command of open source, such as OpenCV, as a data processing program (plug-in) 340 or a method of originally creating a similar program. An argument given to an OpenCV command can be freely set by wrapping this command by a script or including the argument as part of a program name and placing the argument in the column of processing name (processing program) 522.

The row 533 indicates processing of, when a CSV text, outputting a CSV text with information, such as a phone number and a name, categorized as PII deleted. The row 533 indicates that a name of the processing is PII masking and a name of a program performing this processing is opencv2.sh. The row 533 indicates that the processing is processing whose legal regulation-related information is identifier "TN002," that is, processing having a feature of "PII information deleted" in which PII information required of management by statute is deleted before and after the processing. A program deleting PII information and any program can be read as a data processing program (plug-in) 340. The behavior of this program can be freely customized by wrapping the program by a script or including an argument as part of a program name and placing the argument in the column of processing name (processing program) 522.

FIG. 7 is a detailed composition diagram of a compliance status management table according to an embodiment.

In the compliance status management table 384, information, such as exporting source and destination for export in data transfer, compliance status with respect to transport item, and transport permissibility, is placed row by row. The contents of the compliance status management table 384 can be updated by using the processing plug-in adding program 420 or taking other like measures.

The items of columns of the compliance status management table 384 include ID 601, exporting source 602, destination for export 603, exported article and compliance status 604, and export permissibility 605.

In the column of ID 601, an identifier for identifying each row is placed. In the column of exporting source 602, a name of a region as an exporting source and a list of identification information for identifying equipment located in the region are placed. The list of identification information is specifically a list of information, such as a single IP address, a mask of address indicating a range of multiple IP addresses, a single domain name, and a mask of a subdomain indicating multiple domain names. In the column of destination for export 603, a name of a region as a destination for export and a list of identification information for identifying equipment located in the region are placed. The concrete contents of the list of identification information are the same as those for the exporting source 602. In the column of exported article and compliance status 604, an exported article as an object of export and items (for example, a required contract) required by statute or the like for exporting the exported article from an exporting source in the column of exporting source 602 to a destination for export in the column of destination for export 603 in the identical row and supplementary information (for example, an expiration date of a contract) to the item are placed. In the column of export permissibility 605, information indicating whether accommodation (compliance) to an item with respect to a statute or the like in the column of exported article and compliance status 604 is valid or invalid is placed. In the column of export permissibility 605, specifically, "OK" is set when a status of compliance in the column of exported article and compliance status 604 is valid and "NG" is set when the status is invalid.

The row 611 indicates that: for export of "personal information (person)" from "EU" to "USA," "exporting source-contract A" is required and a compliance status of the export is "OK." The row 611 indicates that: all the IP addresses including "10.0." at the head thereof belong to "EU" as an exporting source; and two IP addresses "10.1.3.5" and "10.1.3.6" whose port number is "80" belong to "USA" as a destination for export. The type of exported article indicates personal information identifiable by identifier "P001," that is, person. The item required by statute is that the contents should be identifiable by identifier "J001," that is, the contract A is present at the exporting source. In this example, an expiration date of the contract A of the exporting source is indicated and a written contract is valid. Whether a written contract is valid or invalid can be easily determined by comparing a value of the RTC 230 with a value of the expiration date of the contract A or taking other like measures.

The row 612 indicates that for export of "personal information" from "Japan" to a "USA company," "exporting source-contract B" is required and a compliance status of the export is "OK." As a destination for export, a domain name including ".abcd.co.jp" at the end thereof is specified. Since a specific company can be specified as a destination for export as mentioned above, cases where migration of electronic data to a server of a foreign company located in Japan may be sometimes considered as export depending on a statute or other like cases can be managed.

The row 613 indicates that: not only a contract of an exporting source but also a contract of a destination for export is required. The row 613 indicates that two (multiple) types of statutes are required. Additional conditions required by statute are that DPO (Data Protection Officer) as a person in charge of data protection should be appointed and that self-regulation should be imposed. This example indicates that the export permissibility of export corresponding to the row 613 is "NG."

The compliance status management table can also be utilized in cases where some legal problem other than the above-mentioned determination of export from some region (country, community, or the like) to an external region (country, community, or the like). For example, for a legal problem not involving data migration within an identical country or migration between devices, three elements, an object of a statute, a type and details of the statute, and a determination result, only have to be placed in corresponding fields in the columns of exported article and compliance status 604 and export permissibility 605. With respect to a name of a region to which a statute is applied, an identical regional name may be set both in the column of exporting source 602 and in the column of destination for export 603, setting of a regional name in the column of destination for export 603 may be omitted, or other like measures may be taken.

In the column of export permissibility 605, a condition may be set in addition to such a fixed value as "OK" or "NG." For example, a condition that export should be permitted on condition that data is deleted after data migration and if the data is not deleted, a compliance violation should be constituted and be reported to the authorities may be set for processing after data migration. Specifically, such a condition as "permitted on condition of deletion" may be set in the column of export permissibility 605. A result of processing after data migration can be acquired by executing the data migration permissibility determination/execution program 320; therefore, whether processing after data migration meets a condition can be easily determined. In the column of export permissibility 605, such a condition as "up to 100 exports per day" indicating that up to 100 exports are permitted in a single day may be set. For example, a number of exports involving data migration can be acquired by referring to a history recorded in the flow execution result recording table 387 or taking other like measures; therefore, whether a condition is met can be easily determined. In the column of export permissibility 605, aside from the foregoing, various conditions may be set according to a statute.

FIG. 8 is a composition diagram of a flow definition management table according to an embodiment. FIG. 9 is a detailed composition diagram of a flow management table according to an embodiment.

A concept of "flow" comprised of "node" is expressed by the flow definition management table 385 and the flow management table 386. Here, each step of data processing by the storage computer 102 is defined as "node" and the whole of a series of processing comprised by coupling multiple "nodes" together is referred to as "flow."

In the flow definition management table 385, information about each "node" is stored row by row. The items of columns in each row corresponding to a node in the flow definition management table 385 include ID 701, status 702, node type 703, contents of node processing 704, preceding node 705, and subsequent node 706.

In the column of ID 701, an identifier for identifying a node corresponding to each row. In the column of status 702, information indicating which in a flow is a node corresponding to each row, a start point, an end point, or a relay point, is placed. In the column of node type 703, which is the type of a node corresponding to each row, an input signal defined by a row in the input signal management table 381, processing (processing before data migration, processing after data migration) indicated in the data processing content management table 382 or 383, or data migration whose export permissibility is managed in the compliance status management table 384, is placed. In usual cases, when a node type 703 is input signal, the status 702 of the corresponding row is start point. In the column of contents of node processing 704, information identifying the contents of processing with respect to a node corresponding to each row is placed. For example, in the column of contents of node processing 704, a value of ID 501 in the input signal management table 381, a value of ID 521 in the data processing content management table 382 or 383, or a value of ID 601 in the compliance status management table 384 is placed. When a value of ID in any other table is placed in the column of contents of node processing 704, processing corresponding to a relevant node can be specifically indicated by associating these tables with each row. In the column of preceding node 705, a pointer (identifier of preceding node) to a node (preceding node) preceding in a flow is placed. In the column of subsequent node 706, a pointer to the next node (subsequent node) in a flow is placed. By placing pointers in the columns of preceding node 705 and subsequent node 706, a bidirectional list can be created with respect to a node. A series of nodes coupled with one another by pointers is a flow. With respect to a node whose status 702 is start point, the column of preceding node 705 may be null; and with respect to a node whose status 702 is end point, the column of subsequent node may be null.

One "flow" is comprised of row 711 to row 714. This flow is defined as that: the flow starts with a node (row 711) as a start point receiving an input signal; a node (row 712)

specified as the subsequent node and performing compression as preprocessing is executed; a node (row 713) specified as the subsequent node and performing data migration is executed; and a node (row 714) specified as the subsequent node and performing person extraction as postprocessing is executed.

Another "flow" is comprised of row 715 to row 718. This flow is defined as a flow which starts with two nodes (row 715 and row 716) of start points and in which a node (row 717) of preprocessing receiving these two input signals and a second node (row 718) of preprocessing is executed.

In the flow management table 386 shown in FIG. 9, information about each "flow" is stored row by row. The items of columns of a row corresponding to each flow in the flow management table 386 include ID 731, status 732, flow name 733, and start node 734.

In the column of ID 731, an identifier for identifying a flow corresponding to each row is placed. In the column of status 732, a status of a flow corresponding to each row is placed. Statuses of a flow include whether the flow is being executed, at a stop, or at a temporary stop. In the column of flow name 733, a name of a flow corresponding to each row is placed. In the column of start node 734, an ID (value in the column of the ID 701 of the flow definition management table 385) of a node as a start point of a flow corresponding to each row. As a result, a node as a start point that should be executed first in a flow corresponding to each row can be grasped. Nodes subsequent to a start point can be grasped by referring to a node ID of the subsequent node 706 in a corresponding row in the flow definition management table 385.

The row 741 indicates that a flow named as "monitoring processing" is being executed and a start node of the flow is a node of "F000." The row 742 indicates that a flow named as "3D image creating processing" is at a stop. The row 742 indicates that the flow is processing of creating a 3D image from two inputs, an image for right eye and an image for left eye, and the identifiers of the two nodes as start points for acquiring the image for right eye and the image for left eye are "F005" and "F006."

Figure 10:
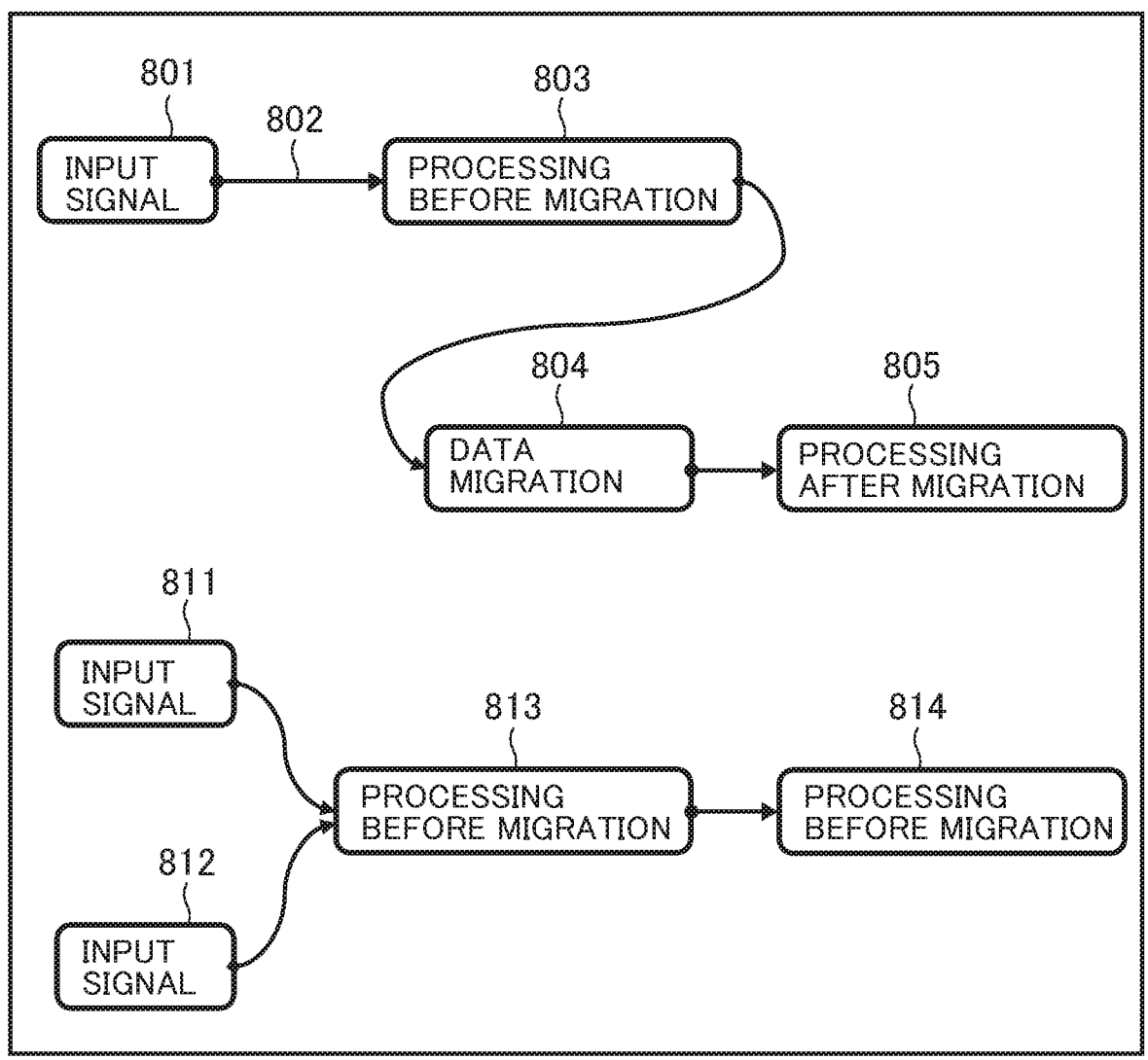
FIG. 10 is a drawing illustrating a configuration of a data processing flow according to an embodiment.

FIG. 10 illustrates a configuration of a flow of processing on data according to an embodiment.

A flow comprised of the row 711 to the row 714 in the flow definition management table 385 is a flow indicated by links (801 to 805) connecting a node and a node. That is, in the flow comprised of the row 711 to the row 714, an input signal (node 801) and processing before migration (node 803) are connected with each other by a link 802 and data migration (node 804) and processing after migration (node 805) are sequentially connected with each other by a link. The node 801, node 803, node 804, and node 805 respectively correspond to the row 711, row 712, row 713, and row 714.

A flow comprised of the row 715 to the row 718 in the flow definition management table 385 is a flow indicated by links (811 to 814) connecting a node and a node. That is, in the flow comprised of the row 715 to the row 718, input signals (node 811 and node 812) are connected to processing before migration (node 813) by a link and further connected to processing before migration (node 814). The node 811, node 812, node 813, and node 814 respectively correspond to the row 715, row 716, row 717, and row 718.

As mentioned above, a flow refers to multiple nodes connected with each other by a link and multiple nodes may be connected to one node or one node may be branched to multiple nodes.

FIG. 11 is a detailed composition diagram of a flow execution result recording table according to an embodiment.

The flow execution result recording table 387 holds a record (log) of execution of a flow and the like. For example, when data migration is astride countries different in exporting source and destination for export, the flow execution result recording table 387 can be used as a record of export.

The items of columns in each row in the flow execution result recording table 387 include ID 901, date and time 902, flow ID 903, node ID 904, node type 905, status of export 906, and processing result 907.

In the column of ID 901, an identifier for identifying each row is placed. In the column of date and time 902, a date and time related to processing (data input, data migration) of a node corresponding to each row is placed. For the basis of date and time, any basis, such as time at which a flow is started, time at which data migration is started, time at which data migration is completed, and time at which entire flow processing is completed, may be used or all of these times may be recorded.

In the column of flow ID 903, information indicating a flow of executed data processing, for example, from where data as an object of a node comes, is placed. Specifically, a definition of a flow on the flow management table 386 can be identified by holding, in the column of flow ID 903, a value of ID 731 in the flow management table 386 corresponding to the flow. Such information as a status 732, a flow name 733, and a start node 734 in a corresponding row may be extracted and placed together with a value of flow ID in the column of flow ID 903 to avoid any influence of change to contents of the flow management table 386 or a snapshot or a copy of the flow management table 386 may be created and referred to.

In the column of node ID 904, information indicating to which node among flows shown in the column of flow ID 903 a record of processing correspond is placed. Specifically, information about a node on the flow definition management table 385 can be identified by holding, in the column of node ID 904, a value of ID 701 in the flow definition management table 385. Such information as status 702, node type 703, contents of node processing 704, preceding node 705, and subsequent node 706 may be extracted and placed together with a value of node ID in the column of node ID 904 to avoid influence of change to contents of the flow definition management table 385 or a snapshot or a copy of the flow definition management table 385 may be created and referred to.

In the column of node type 905, a type of a node is placed. Types of nodes include whether a relevant node is processing of data input as a start point, processing of data migration corresponding to export, data processing as an end point, or any other data processing.

The column of status of export 906 indicates processing result, such as exported article, compliance, and export permissibility, at a node in a flow corresponding to each row. Specifically, information on the compliance status management table 384 can be identified by holding a value of ID 601 in the compliance status management table 384 in the column of status of export 906. Such information as exporting source 602, destination for export 603, exported article and compliance status 604, and export permissibility 605, may be extracted and recorded together with a value of ID 601 in the column of status of export 906 to avoid influence of change to contents of the compliance status management table 384 or a snapshot or a copy of the compliance status management table 384 may be created and referred to.

In the column of processing result 907, a processing result of a node corresponding to each row is placed. When a value of node type 905 is end point, a final processing result of an entire relevant flow is placed in the column of processing result 907. When a processing result is error, such supplementary information as a cause of the error including migration failed and the like is set in the column of processing result 907. When a processing result is normal termination, such supplementary information as a detailed processing result, for example, whether personal information has been deleted at a destination of data migration, is included.

The row 911 indicates that: as a result of execution of a node identified by flow ID 903 and node ID 904, no special problem related to statute arises and an error has occurred because of failure in data reception. Since a processing result is error, it is indicated that the result is a final processing result of the entire flow. In cases where some processing error has occurred but the processing of a relevant flow is continued, normal termination may be set in the column of processing result 907 and processing error may be recorded as supplementary information to the result.

The row 912 indicates that: as a result of execution of a node identified by flow ID 903 and node ID 904, a legal problem described in the row of ID "R6000" on the compliance status management table 384 is the case. The row further indicates that a determination result of export permissibility is "permissible" and the relevant migration of data has been normally terminated.

The row 913 indicates that the processing is the same as that in the example of the row 912 and a processing result is similarly normal termination. For the row 913, the column of processing result 907 includes supplementary information that personal information as exported article has been deleted. Since in this row 913, the node type 905 indicates end point, it is indicated that a result in the column of processing result 907 is a final processing result of an entire relevant flow.

In such a configuration that a thread is used to simultaneously process multiple flows, an identifier of the thread may be added to the column of flow execution result recording table 387 or a new identifier may be added to identify multiple identical flows simultaneously executed.

FIG. 12 is a detailed composition diagram of a basic setting table according to an embodiment.

The basic setting table 388 is a table for holding information such as network setting and a place of installation of a storage computer 102 and initialized by the initialization program 440.

The items of columns of the basic setting table 388 include ID 921, setting item 922, and value 923. In the column of ID 921, an identifier of each row is placed. In the column of setting item 922, a name of an item required for setting is placed. In the column of value 923, a set value corresponding to an item name of a setting item 922 for each row is placed.

For the row 931, a region of installation is placed in the column of setting item 922 and a name of a country, a regional name, and GPS coordinates are placed in the column of value 923. According to these countries and regions, a statute to adhere to is determined and an exporting source in the column of exporting source 602 and a destination for export in the column of destination for export 603 of the compliance status management table 384 are determined.

For the row 932, a host name is placed in the column of setting item 922 and a name of a corresponding storage computer, a domain name, FQDN (Fully Qualified Domain Name) obtained by adding a domain name to a host name, and the like are placed in the column of value 923.

For the row 933, an IP address is placed in the column of setting item 922 and an IP address of a corresponding storage computer is placed in the column of value 923. In the column of value 923, multiple IP addresses can be set. The IP address need not be a global IP address to which connection can be established from anywhere in a network but may be a private IP address. Especially, for such a closed path that a terminal computer and a storage computer are directly connected with each other, it is preferable that a fixed private IP address is allocated in advance. As a result, minimum communication can be performed between the terminal computer and the storage computer without specially making any additional network setting. It is desirable to allocate a dedicated network interface to such a path.

For the row 934, a default gateway is placed in the column of setting item 922 and an IP address of a default gateway of a storage computer is placed in the column of value 923. For the row 935, a DNS (Domain Name System) server is placed in the column of setting item 922 and an IP address of a DNS server of a storage computer is placed in the column of value 923.

Aside from the above-mentioned GPS coordinates and network setting, any setting of a storage computer can be included in the columns of basic setting table 388. A table related to network setting, similar to the basic setting table 388, is provided in all other devices, such as the terminal computer 101 and the signal generator 109, connected to a network. Therefore, all the devices can use such information as IP address on a table to communicate data between the devices.

A detailed description will be given to compositions of the export item table 389, the processing feature table 390, the input/output type table 391, and the statute type table 392. Aside from these tables, various parameters can be composed in tabular form. Tabulation allows contents to be updated table by table or row by row using the processing plug-in adding program 420.

Figure 13:
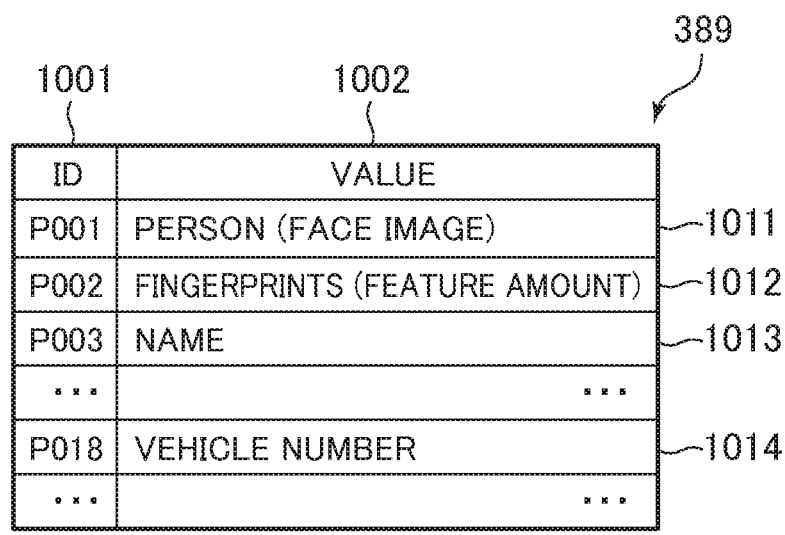
FIG. 13 is a detailed composition diagram of an export item table according to an embodiment.

FIG. 13 is a detailed composition diagram of an export item table according to an embodiment.

The export item table 389 defines "identifier of exported article" used in the column of legal regulation-related information 505 of the input signal management table 381, the column of exported article 604 of the compliance status management table 384, and the like. The items of columns of the export item table 389 include ID 1001 and value 1002. In the column of ID 1001, an identifier of an exported article is placed. In the column of value 1002, varied information related to a legal problem corresponding to an exported article with an identifier of ID 1001 in an identical row is placed. Information related to a legal problem includes information itself, such as a face image of a person (row 1011), that allows a relevant person to be identified by itself and a feature amount (row 1012), such as fingerprints of a person. Information related to a legal problem includes: information, such as name (row 1013), that can involve a problem of the same family and personal name; and information, such as a number of a vehicle (row 1014), with which an individual can be identified by combination with other information. Information that allows a relevant person to be identified includes fingerprints, an image of an iris, and the like.

A feature amount of a person placed in the row 1012 is characterized in that: a relevant person cannot be identified just by looking at the feature amount but can be identified by comparing the feature amount with a feature amount obtained from the relevant person. A group identifier that allows a group of information of a similar type to be collectively selected may be added to the items of columns of the export item table 389. In the column of this added item, a list of identifiers of groups to which individual exported articles belong is placed. An identifier of a group can also be utilized to indicate an exported article in another table exactly similarly to ID 1001.

Figure 14:
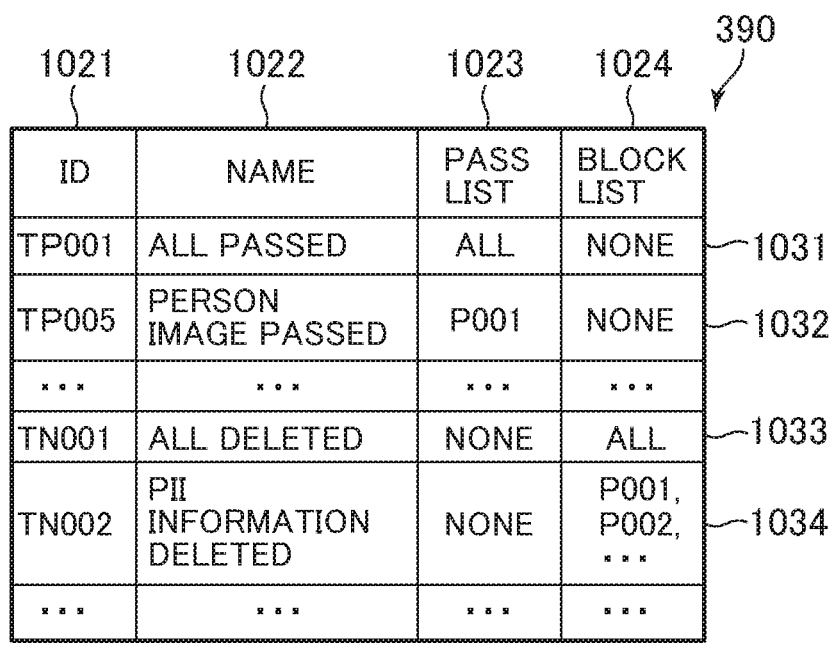
FIG. 14 is a detailed composition diagram of a processing feature table according to an embodiment.

FIG. 14 is a detailed composition diagram of a processing feature table according to an embodiment.

The processing feature table 390 defines an "identifier indicating a feature of processing" used in the column of legal regulation-related information 525 of the data processing content management table 382 (383) and the like. The items of columns of the processing feature table 390 include ID 1021, name 1022, pass list 1023, and block list 1024. In the column of ID 1021, an identifier indicating a feature of processing is placed. In the column of name 1022, a name indicating a feature of processing is placed. In the column of pass list 1023, a type of information maintained before and after processing corresponding to a feature of processing corresponding to each row is placed as a list of identifiers defined in the export item table 389. In the column of block list 1024, a type of information that is not maintained and lost before and after processing corresponding to each row is placed as a list of identifiers defined in the export item table 389.

FIG. 15 is a detailed composition diagram of an input/output type table according to an embodiment.

The input/output type table 391 defines an identifier of a data type that can be used in the columns of input type list 523 and output type list 524 of the data processing content management table 382 (383). The items of columns of the input/output type table 391 include ID 1041 and value 1042. In the column of ID 1041, an identifier of a data type is placed. In the column of value 1042, varied information related to a data type is placed. Examples of information placed in the column of value 1042 are not only a broad type of data, such as video data, text data, and binary data but also a type of data, such as a format and a specification, required for reading or outputting data.

FIG. 16 is a detailed composition diagram of a statute type table according to an embodiment.

The statute type table 392 defines a type of a measure required by statute with respect to a legal problem. A type of a measure that is not required by statute may also be included in the statute type table 392. The items of columns of the statute type table 392 include ID 1061, specified by statute 1062, and check script program 1063. In the column of ID 1061, an identifier of a measure required by statute is placed. In the column of specified by statute 1062, a type of a measure required by statute is placed. In the column of check script program 1063, a code of a script program for checking compliance, such as checking of an expiration date of a contract, is placed or a path to a file storing this script program is placed.

The row 1071 indicates that contract A at an exporting source is required by statute and indicates a path (/check/a.sh) to a file storing a script program for performing this compliance check. The row 1072 indicates that contract C at a destination for export is required by statute and indicates a path (/check/b.sh) to a file storing a script program for performing this compliance check. The row 1073 indicates that appointment of a person in charge (DPO) is required by statute and indicates a path (/check/d.sh) to a file storing a script program for performing this compliance check. The row 1074 indicates self-regulation E that is not absolutely required by statute and a path (/check/e.sh) to a file storing a script program for performing this compliance check.

A description will be given to processing operation at the computer system 1.

Figure 17:
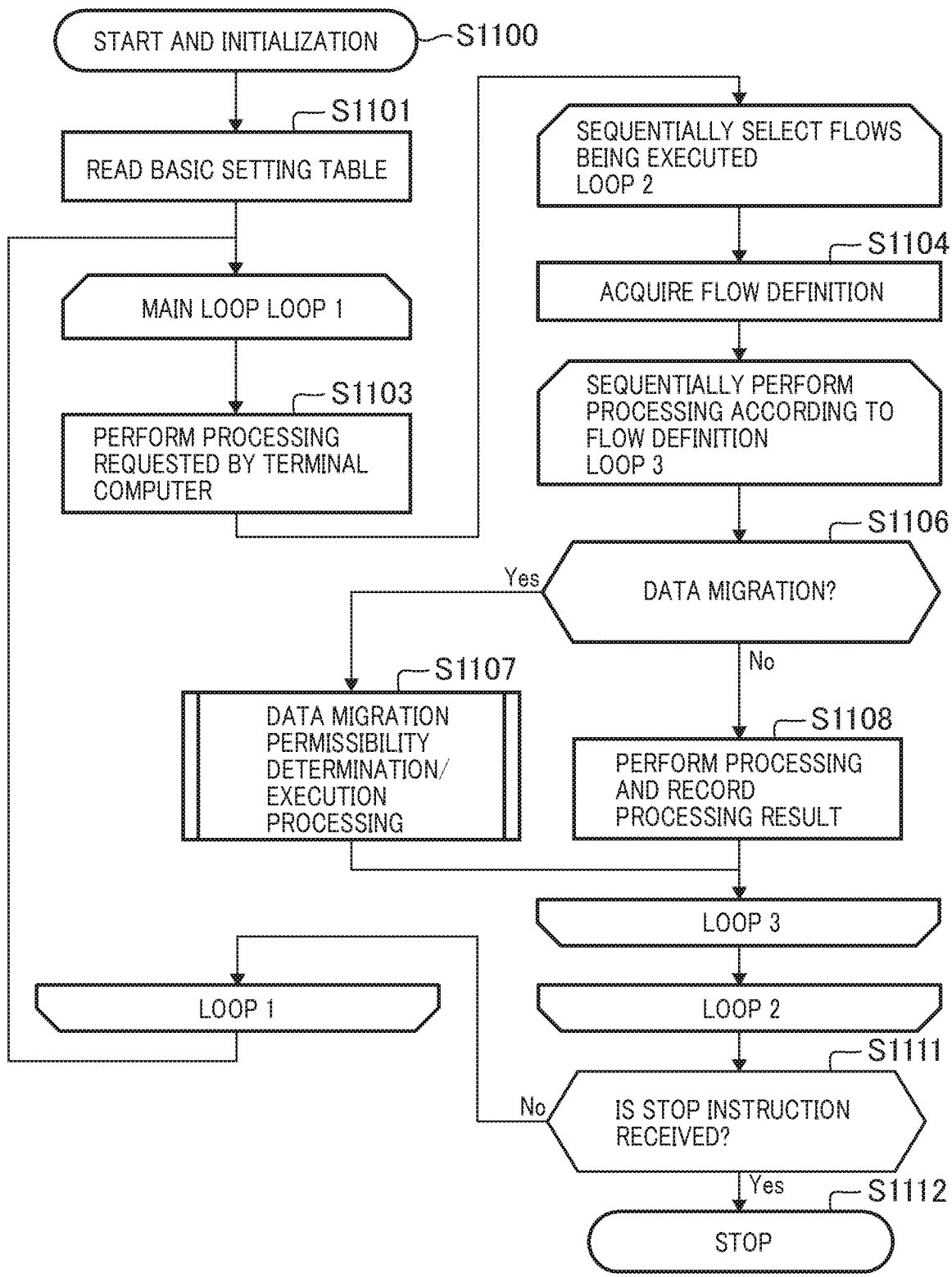
FIG. 17 is a flowchart of data migration control processing according to an embodiment.

FIG. 17 is a flowchart of data migration control processing according to an embodiment.

The data migration control processing is implemented by the CPU 201 executing the control program 310 of the storage computer 102. The control program 310 defines overall operation of the storage computer.

Before the data migration control processing, the storage computer 102 is executing start processing. Specifically, when power is turned on, the storage computer 102 initializes varied hardware, BIOS (Basic Input Output System), and the like. The CPU 201 executing the BIOS reads the control program 310 from the recording medium 104 and develops the program on the memory 202 so that the program can be executed by the CPU 201 (S1100).

Subsequently, the control program 310 (strictly speaking, the CPU 201 executing the control program 310) reads the basic setting table 388 from the recording medium 104 onto the memory 202 and continues initialization using this information. The control program 310 similarly reads another program and table onto the memory 202 as well (S1101). Subsequently, the control program 310 starts processing of loop 1 as a main loop (S1103 to S1111).

In the processing of loop 1, first, the control program 310 executes all of processing, if any, requested by the terminal computer 101 (S1103). A specific description of the processing will be described later. Subsequently, the control program 310 sequentially takes flows registered in the flow management table 386 as a processing object and executes the flows. Specifically, the control program 310 selects a flow whose status 732 in the flow management table 386 is executing and takes each flow as a processing object and executes processing of loop 2 (S1104 to S1108). Here, a flow as a processing object is referred to as target flow.

In the processing of loop 2, first, the control program 310 refers to a start node 734 of a row corresponding to a target flow in the flow management table 386 and identifies a start node as a start point of the flow. The control program acquires information about a node type 703, contents of node processing 704, and a subsequent node 706 of a row corresponding to the start node in the flow definition management table 385 (S1104). The control program 310 then performs the processing of loop 3 with each node from a start node in the target flow to a node as an end point of the flow taken as a processing object (S1106 to S1108). Here, a node as a processing object is referred to as target node.

In the processing of loop 3, the control program 310 confirms a node type 703 of a row corresponding to a target node in the flow definition management table 385 and determines whether anode type of the target node is data migration (S1106). When as the result of the determination, a node type of the target node is data migration (S1106: Yes), the control program 310 performs data migration permissibility determination/execution processing (Refer to FIG. 18) (S1107). In the data migration permissibility determination/execution processing, a result of the execution is recorded in the flow execution result recording table 387.

Meanwhile, when a node type of the target node is not data migration (S1106: No), the control program 310 performs the processing of this node and records a processing result in the flow execution result recording table 387 (S1108). Specifically, the control program 310 executes a data processing program (plug-in) 340 and the like corresponding to processing specified in the column of contents of node processing 704 of a row corresponding to the target node.

When Step S1107 or S1108 is performed, a processing result of the target node is success, and a subsequent node is placed in the column of subsequent node 706 of the row of the target node, the control program 310 continues the processing of loop 3 with the subsequent node taken as the next processing object. Meanwhile, when a processing result is fail, the control program 310 determines that an error has occurred and exits from loop 3. When a subsequent node is not present, the control program 310 exits from loop 3.

When any flow that is being executed and is not taken as a target of the processing of loop 2 is present, the control program 310 subsequently takes this flow as a new processing object and performs the processing of loop 2.

When any flow that is being executed and is not taken as a target of the processing of loop 2 is not present, the control program 310 exits from loop 2.

Subsequently, the control program 310 determines whether a stop instruction has been received from the terminal computer 101 at Step S1103 (S1111) and, when a stop instruction has not been received (S1111: No), repeats the processing of loop 1. Meanwhile, when a stop instruction has been received, the control program 310 shuts down the storage computer 102 and stops the operation (S1112).

Processing whose contents have a parallel property, such as a step (S1103) executed after a request is received from the terminal computer 101 and a step (S1104 to S1108) at which individual flows are executed, may be performed in parallel by respective different threads. As a result, influences on performance, such as wait for request reception and wait for processing completion, can be prevented.

A description will be given to data migration permissibility determination/execution processing (S1107).

Figure 18:
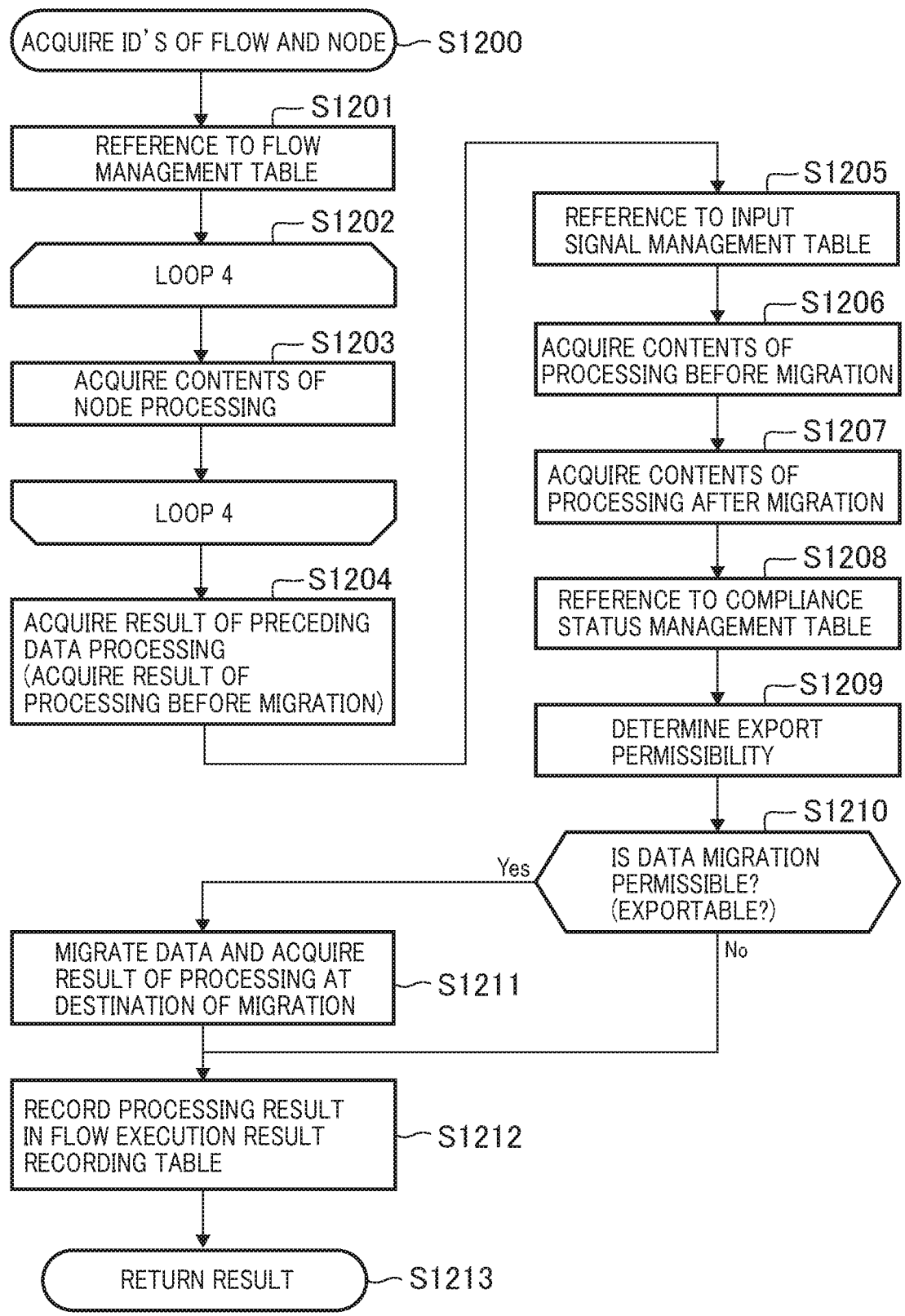
FIG. 18 is a flowchart of data migration permissibility determination/execution processing according to an embodiment.

FIG. 18 is a flowchart of data migration permissibility determination/execution processing according to an embodiment.

The data migration permissibility determination/execution processing is performed by the control program 310 invoking the data migration permissibility determination/execution program 320 and causing the CPU 201 to execute the program. In the data migration permissibility determination/execution processing, the data migration permissibility determination/execution program 320 checks the presence or absence of any legal problem with respect to the data migration processing of a flow and a node selected by the control program 310 to determine the permissibility of export and records a processing result of the data migration processing.

The data migration permissibility determination/execution program 320 first refers to an argument and acquires IDs of the selected flow (target flow) and node (target node) and further refers to a start node 734 of a row corresponding to the target flow in the flow management table 386 and acquires a node ID of the start node (S1200).

Subsequently, the processing of loop 4 of reading information about all the nodes constituting a flow is performed utilizing the acquired node ID (S1203). When information about all the nodes has been already read, the processing of loop 4 may be omitted.

In loop 4, first, the data migration permissibility determination/execution program 320 identifies a row corresponding to the node ID of a start node in the flow definition management table 385 and acquires contents of node processing from the row (S1203). Then, when a node ID of a subsequent node is present in the column of subsequent node 706 of the row, the data migration permissibility determination/execution program 320 performs the processing of loop 4 on a node of the node ID and continues the processing of loop 4 until contents of node processing are read with respect to all the nodes constituting the target flow.

When reading of information about all the nodes constituting the flow is completed, the data migration permissibility determination/execution program 320 exits from loop 4 and uses the acquired information about the nodes to sequentially acquire information required for determining data migration permissibility. First, the program utilizes ID of the target node and acquires a processing result (a list of a result of an immediately preceding node or results of all the preceding nodes) preceding to the data migration processing of the target node by referring to the column of processing result 907 of the flow execution result recording table 387 (S1204).

Subsequently, the data migration permissibility determination/execution program 320 refers to the input signal management table 381 and acquires legal regulation-related information 505 corresponding to a node whose node type 703 is input signal (S1205). Subsequently, the data migration permissibility determination/execution program 320 refers to the data processing content management table 382 and acquires all the legal regulation-related information 525 corresponding to a node of performing processing before data migration (S1206). Subsequently, the data migration permissibility determination/execution program 320 refers to the data processing content management table 383 of the storage computer 112 at a transfer destination and acquires all the legal regulation-related information 525 corresponding to a node of performing processing after data migration (S1207). Subsequently, the data migration permissibility determination/execution program 320 refers to the compliance status management table 384 and acquires such information as exported article and compliance status 604, export permissibility 605, and the like (S1208).

Subsequently, the data migration permissibility determination/execution program 320 checks information collected at Steps S1201 to S1208 and performs export permissibility determination (determination of data migration permissibility) on applicable data (S1209). The concrete contents of export permissibility determination processing will be described later.

Subsequently, the data migration permissibility determination/execution program 320 determines whether a result of export permissibility determination is exportable (S1210). When the result is exportable (S1210: Yes), the program performs data migration of corresponding data and acquires a processing result at the destination of migration in the form of response to a data migration request (S1211), adds a new row to the flow execution result recording table 387 (gives anew ID), and records the processing result (S1212).

Meanwhile, when the result is unexportable (S1210: No), the data migration permissibility determination/execution program 320 does not perform data migration, adds a new row to the flow execution result recording table 387 (gives anew ID), and records the processing result that data migration is an error (S1212). The recording of a processing result at Step S1108 in FIG. 17 is the same processing as that of Step S1212.

After the processing of Step S1212 is performed, the data migration permissibility determination/execution program 320 returns the processing result recorded at Step S1212 as a return value to the control program 310 and terminates the processing (S1213).

A description will be given to the export permissibility determination step (S1209).

Figure 19:
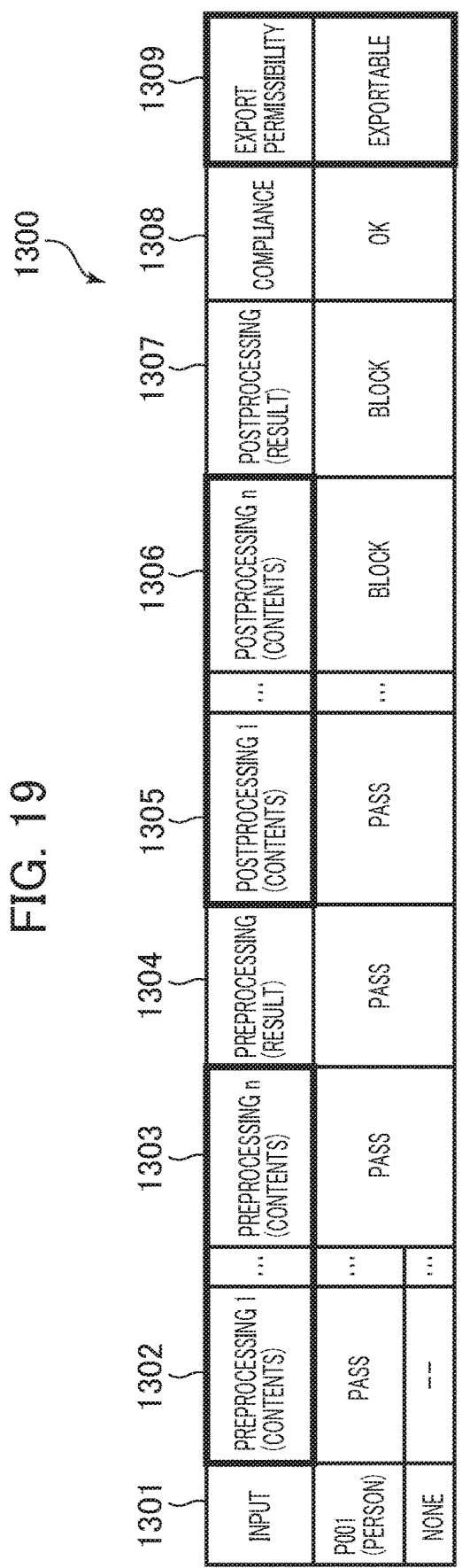
FIG. 19 is a drawing explaining export permissibility determination steps according to an embodiment.

FIG. 19 illustrates an export permissibility determination step according to an embodiment.

FIG. 19 illustrates an example of a multidimensional array variable 1300 used at the export permissibility determination step (S1209). Various possible methods for an export permissibility determination step are present and use of an array is one of such methods.

For the array variable 1300, in the first dimension (first row) of the array, a value related to a legal problem at each node constituting a flow is sequentially placed from input (1301 to 1307) and compliance status (1308) and export permissibility (1309) are placed. In this array variable 1300, when multiple parallel nodes are present, for example, when multiple input signals are present, all the values of the individual nodes are arranged and placed in the subsequent and following dimensions (subsequent and following rows) of the array variable 1300.

A detailed description will be given to a flow of the export permissibility determination step.

First, the data migration permissibility determination/execution program 320 refers to the flow definition management table 385 and the input signal management table 381 and places an identifier of a legal problem contained in an input signal in the array. For example, when an identifier (P001) indicating a picture or an image embracing a person is present in a table, the identifier is placed as an array element (1301). When multiple input signals or legal problems are present, the signals or legal problems are separately placed in the subsequent dimension of the array.

Subsequently, the data migration permissibility determination/execution program 320 refers to the flow definition management table 385 and the data processing content management table 382 and either value of "block" or "pass" corresponding to the contents of processing subsequent to input processing and preceding data migration processing is placed in a corresponding element (1302) of the array. "Block" cited here means that applicable processing deletes a section (information) corresponding to a legal problem in data and prevents the section from flowing to subsequent processing; and "pass" means that applicable processing passes data to the subsequent processing with a legal problem remaining in the data. Whether the contents of processing are "block" or "pass" can be determined by identifying an identifier (TP001 or the like) indicating the features of pass or block corresponding to the processing from the data processing content management table 382 and referring to the processing feature table 390 using the identifier. When n processes are present before data migration processing, "block" or "pass" is sequentially placed inn elements (1302 to 1303) from the input side. When multiple nodes are consolidated into one node at some midpoint of a flow, dimensions of the array after the point of consolidation are reduced. Conversely, when one node is branched into multiple nodes, dimensions of the array after the point of branching are increased.

Subsequently, the data migration permissibility determination/execution program 320 places a processing result of preprocessing acquired at S1204 in the subsequent element (1304) of the array. The reason why a processing result is placed as mentioned above is to allow such cases as described below to be appropriately determined: cases where a processing result is "block," for example, cases where output is not present because of some error in processing before data migration processing or cases where in processing of extracting a person or the like, any person is not embraced and nothing can be extracted. In these cases, a legal problem does not arise in data migration of data of the processing result and the data is exportable.

Subsequently, the processing contents (1305 to 1306) of n processes after data migration processing and processing results (1307) of the processes are similarly placed in the array. Thereby, the export stream of continuous transfer data can be stopped as necessary, depending on whether the exported data has been properly processed at the export destination.

Subsequently, the data migration permissibility determination/execution program 320 refers to the compliance status management table 384 and the flow definition management table 385 and places an exporting source, a destination for export, and a value of export permissibility 605 of data migration processing to be performed in the subsequent element (1308) of the array. An exporting source and a destination for export of data migration processing to be performed can be identified by various methods. Examples of such methods include: a method in which a value of ID 601 of a corresponding row in the compliance status management table 384 is placed in the column of contents of node processing 704 and the value is used to refer to a corresponding row in the compliance status management table 384; a method in which an exporting source and a destination for export are directly placed in the column of contents of node processing 704 and a row identical in exporting source and destination for export is extracted from the compliance status management table 384; a method in which a value of a region of installation of the storage computer 102 placed in the basic setting table 388 is used as a value of exporting source. In addition, a method is also available in which a name of a country or a regional name as an exporting source and a destination for export are mutually acquired between multiple storage computers performing data migration by sharing the basic setting table 388 between the storage computers by a shared folder or the like.

The data migration permissibility determination/execution program 320 writes values required for export permissibility determination in an array as mentioned above and sequentially refers to the values from the top of the array. The program thus gives consideration to: "whether the data is data (object of export) involving a legal problem at all," "whether the data can be passed to data migration processing," "whether the data was actually passed," "whether the data is placed anywhere after data migration or deleted after being utilized in some processing," "whether the data was actually successfully deleted," "whether compliance with respect to the data has been completed," and the like. When data export does not involve any problem, the program determines export permissibility as "exportable," and when data export involves some problem, the program determines as "unexportable." The program then places a determination result in an array element (1309). The data migration permissibility determination/execution program 320 determines export permissibility as "exportable," for example, in the following cases: cases where personal information or the like is included in none of input data; cases where the contents of preprocessing is "block"; cases where a result of preprocessing is "block"; and cases where compliance is OK. In cases where a statute stipulating that data may be exported if blocked by postprocessing is applied, when the contents of postprocessing is block, export permissibility may be determined as "exportable" even though a result of postprocessing is block.

When a condition, such as "permitted on condition of deletion" or "up to 100 exports per day," is set in the column of export permissibility 605 of the compliance status management table 384, processing can be similarly performed by taking the following measure: information in a table required for condition determination is referred to; when the condition is met, "OK" is additionally placed in the array 1300 and when the condition is not met, "NG" is additionally placed. In addition, compliance may also be determined by referring to the column of compliance status 604 of the compliance status management table 384 to check an expiration date of a contract or the like in real time. The processing can be implemented by registering a script program in the statute type table 392.

Figure 20:
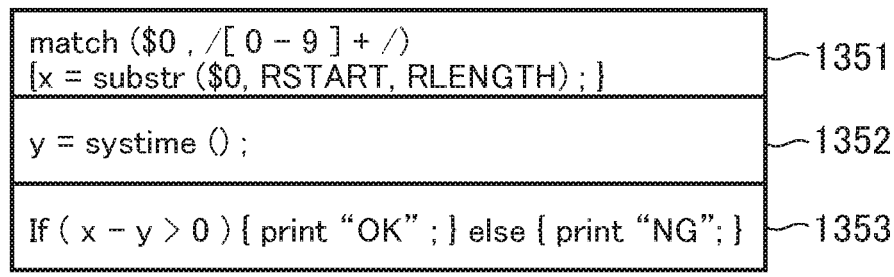
FIG. 20 is a drawing illustrating an exemplary check script program according to an embodiment.

FIG. 20 illustrates an example of a check script program according to an embodiment.

This check script program is an example of a script program checking an expiration date of a statutory written contract.

The check script program includes the following descriptions: a description 1351 that an expiration date of a contract is extracted form compliance status 604 of the compliance status management table 384 and substituted into variable x; a description 1352 that a current time is substituted into variable y; and a description 1353 that when variable x is greater than variable y, that is, when the current time is within the expiration date, "OK" is outputted and when not, "NG" is outputted. In the example in FIG. 20, gawk is used as a script language but any language may be used instead. FIG. 20 shows a script program for expiration date check but a script program that allows any check may be provided.

A description will be given to processing plug-in adding processing.

Figure 21:
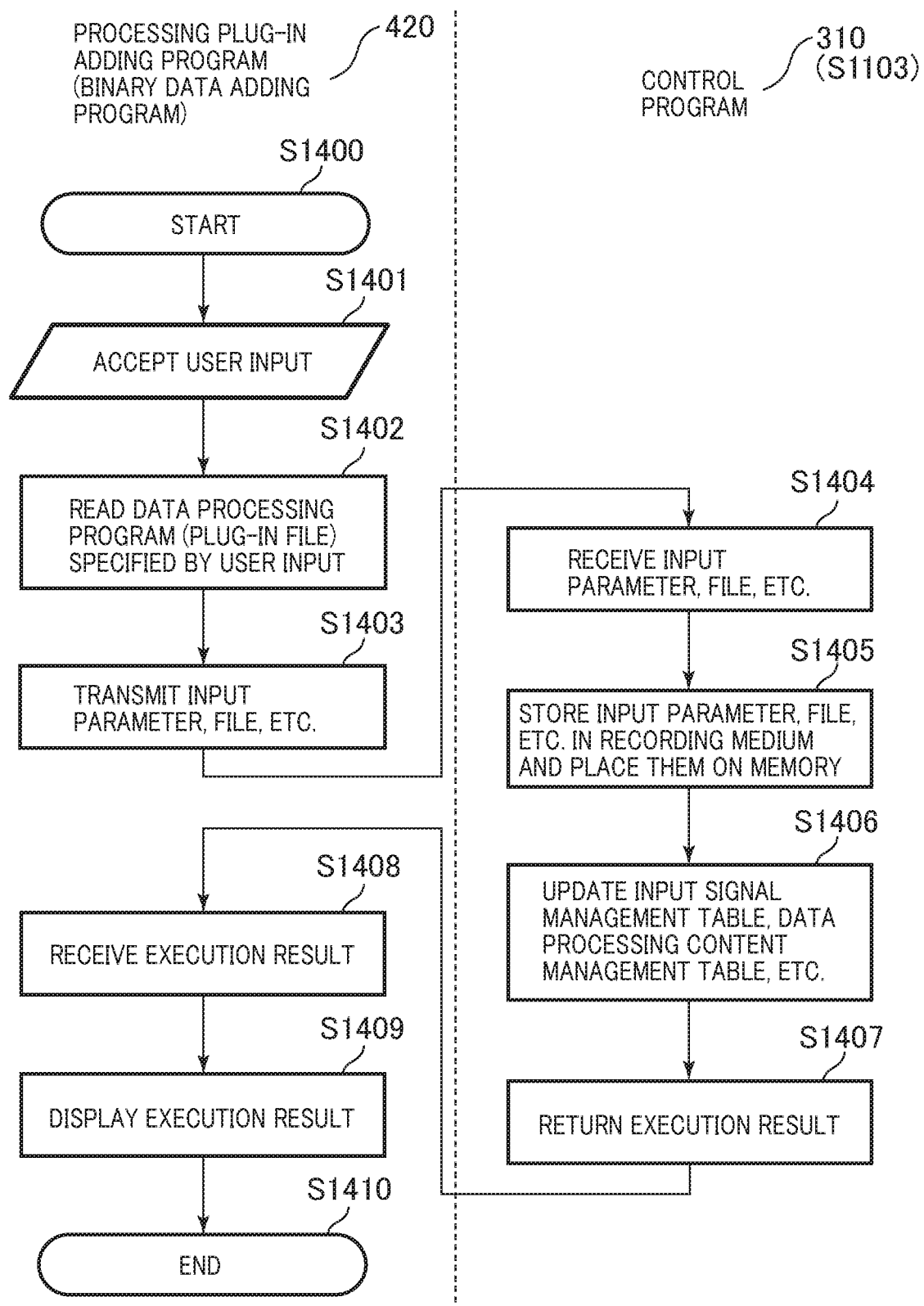
FIG. 21 is a flowchart of a processing plug-in adding processing according to an embodiment.

FIG. 21 is a flowchart of a processing plug-in adding processing according to an embodiment.

When executed by the CPU 201 of the terminal computer 101, the processing plug-in adding program 420 implements a function of adding a new data processing program (plug-in) 340 to the storage computer 102 (112). The processing plug-in adding program 420 is applicable to adding and overwrite-updating of any binary data including a program, a table, and the like other than the data processing program (plug-in). For example, such a program as a driver for receiving an input signal is included in a type of data processing program (plug-ins). Such a table as the compliance status management table 384 is included in binary data. Hereafter, a detailed description will be given to processing plug-in adding processing.

When the processing plug-in adding program 420 is executed by the CPU 201 of the terminal computer 101, the processing plug-in adding processing is started (S1400).

The processing plug-in adding program 420 accepts an input specifying a data processing program (plug-in) 340 to be added from a user (S1401). Specifically, the processing plug-in adding program 420 accepts an input of a path to a recording medium storing a newly added or overwritten program (binary data) or a parameter set in processing name (processing program) 522, input type list 523, output type list 524, and legal regulation-related information 525 managed on the data processing content management table 382. User input may be omitted to the minimum by accepting binary data including the contents of input. In any case, the processing plug-in adding program 420 accepts an input of information identifying the contents of adding and updating of a program or a table placed on the memory 202 of the storage computer 102.

Subsequently, the processing plug-in adding program 420 uses a path to the recording medium storing the new data processing program (plug-in) 340 accepted from the user to read a data processing program (S1402). For example, the processing plug-in adding program 420 reads binary data provided in a USB memory when a path to the USB memory is specified and reads binary data provided from a remote server when a path to a network drive is specified. Subsequently, the processing plug-in adding program 420 transmits the contents accepted from the user, the read binary data, and the new data processing program (plug-in) 340 to the storage computer 102 and requests processing of the data (S1403).

The control program 310 of the storage computer 102 that received the processing request processes the request from the terminal computer 101 at Step S1103 of the data migration control processing (FIG. 17). Specifically, the control program 310 reads the transmitted data in response to the data processing request transmitted from the terminal computer 102 (S1404). Subsequently, the control program 310 stores the received data on the recording medium 104 and places or overwrites the data on the memory 202 (S1405). The control program 310 updates the contents of a table related to the data placed or overwritten on the memory 202 (S1405). For example, in case of addition of a data processing program (plug-in) 340, the control program 310 uses a parameter obtained at Step S1404 to insert a new row having a new ID to the data processing content management table 382 or updates the contents of an existing row having a specified ID. At this time, the control program. 310 may achieve synchronization so as to make table contents identical between multiple storage computers.

Subsequently, the control program 310 returns a result indicating whether this series of processing succeeded or failed (S1407). For example, when data reception fails, a free space in a recording medium is insufficient, or a row with a specified ID is not present in a table, the processing of Steps S1404 to S1406 may fail.

The processing plug-in adding program 420 of the terminal computer 101 receives a result of execution returned from the storage computer 102 (S1408), displays this result of execution on the display 210 (S1409), and terminates the processing (S1410).

As described up to this point, according to the processing plug-in adding processing, a user can use the terminal computer 101 to add a data processing program 340 to the storage computer 102 or update a table.

A description will be given to a further function of the storage computer 102 according to an embodiment.

The GDPR makes it obligatory for large-sized enterprises to appoint DPO as a person in charge of data protection. The DPO is responsible for managing information, such as personal information, specified by statute so that the information is appropriately handled. In cases where such information as personal information is leaked to a third party or in other like cases, it is obligated to report the leakage to the authorities within a predetermined time. Consequently, the storage computer 102 has a function of outputting a report (data migration history report) for informing DPO of the situation of processing of information specified by statute.

Figure 22:
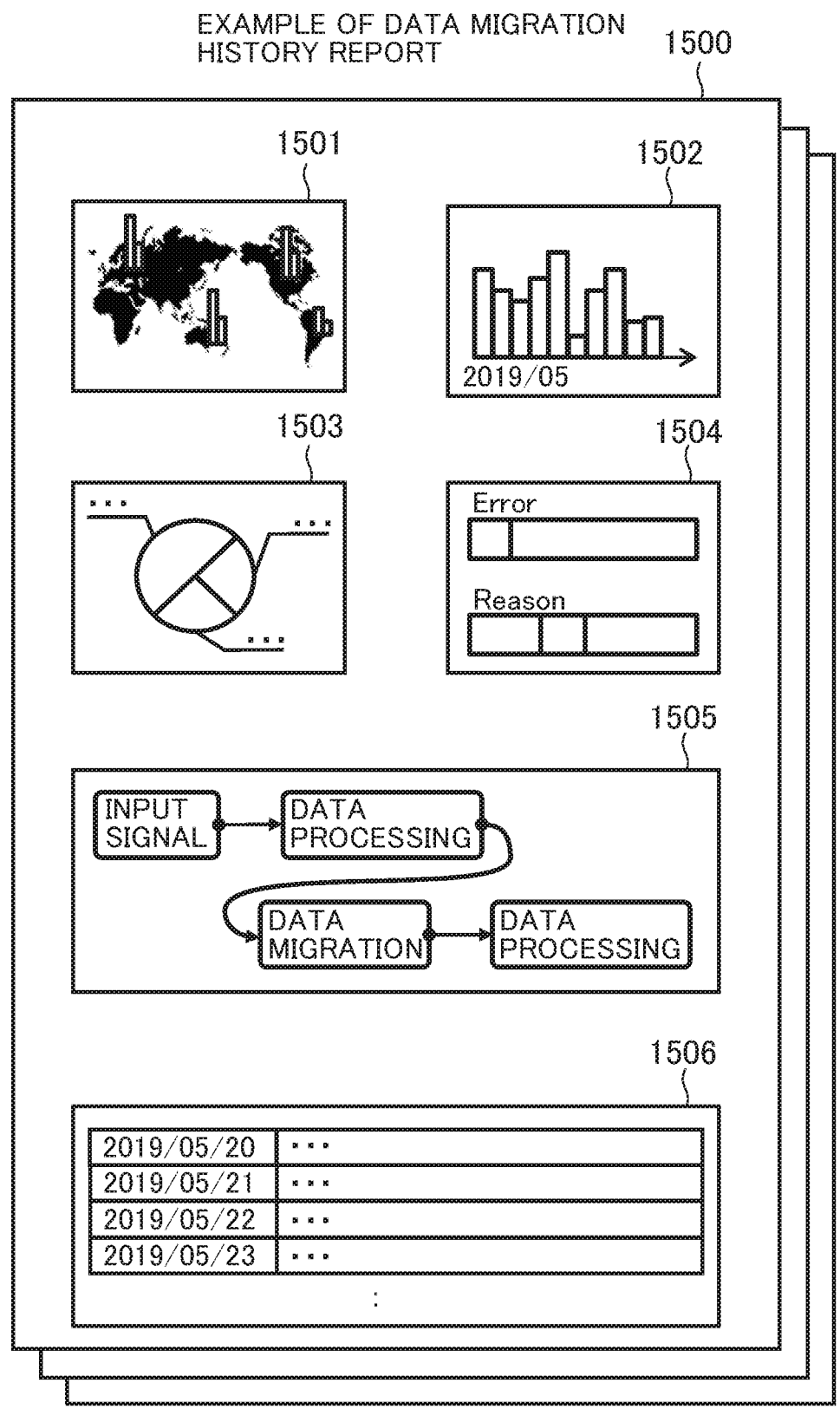
FIG. 22 is a drawing illustrating an exemplary data migration history report according to an embodiment.

FIG. 22 illustrates an example of a data migration history report according to an embodiment.

The data migration history report 1500 may be an electronic file, such as PDF (Portable Document Format), displayed on a screen of the display 210 or may be of paper printed with a printer connected to the storage computer 102 via USB or a network.

The data migration history report 1500 bears information related to multiple legal problems. The components of the data migration history report 1500 include graph 1501, bar graph 1502, pie chart 1503, ratio graph 1504, graph 1505, and history 1506.

The graph 1501 indicates how much information involving a legal problem to be solved is exported or imported between storage computers installed all over the world. By overlapping a bar graph on a map, geographical relation with respect to data on information involving a legal problem to be solved is visualized. The graph 1501 can be implemented by mutually referring to values of GPS coordinates 931 in the basic setting table 388 stored in each storage computer by such a technology as a shared folder.

The bar graph 1502 indicates transition with time of amount of export or amount of import of information involving a legal problem to be solved. For the horizontal axis of the bar graph 1502, any unit including daily, monthly, yearly, and the like is selectable. A transition with time of any information, such as amount of export, for each exported article can be obtained by summation based on the flow execution result recording table 387. Specifically, a summation for each specific period or result can be obtained by referring to values in the columns of date and time 902 and status of export 906 of the flow execution result recording table 387. Various statistical or summarization techniques, including average, ratio, simple tabulation, cross tabulation, and the like, can be utilized for summation.

The pie chart 1503 indicates a ratio of a destination for export, a ratio of an exported article, and the like. These ratios can be obtained by summarizing the contents of status of export 906 of the flow execution result recording table 387 and the like.

The ratio graph 1504 indicates a ratio of an occurrence of an error in export processing or the like and a breakdown of reasons of the error. This ratio can be obtained by summarizing the contents of processing result 907 of the flow execution result recording table 387 and the like.

The graph 1505 represents an actually used flow and nodes. The graph 1505 may be visualized, for example, in such a manner that a node larger in number of times of processing is indicated in brighter color. The contents of this display can be obtained by summarization based on flow ID 903 and node ID 904 of the flow execution result recording table 387 or other like measures.

The history 1506 indicates contents themselves recorded in the flow execution result recording table 387 and a log of summation of the contents day by day, month by month, or the like. These contents can be easily outputted by referring to the flow execution result recording table 387.

Aside from the above-mentioned components, the data migration history report 1500 may bear, as a component, varied information obtained from the flow execution result recording table 387 or the like or information obtained by processing these pieces of information.

Figure 23:
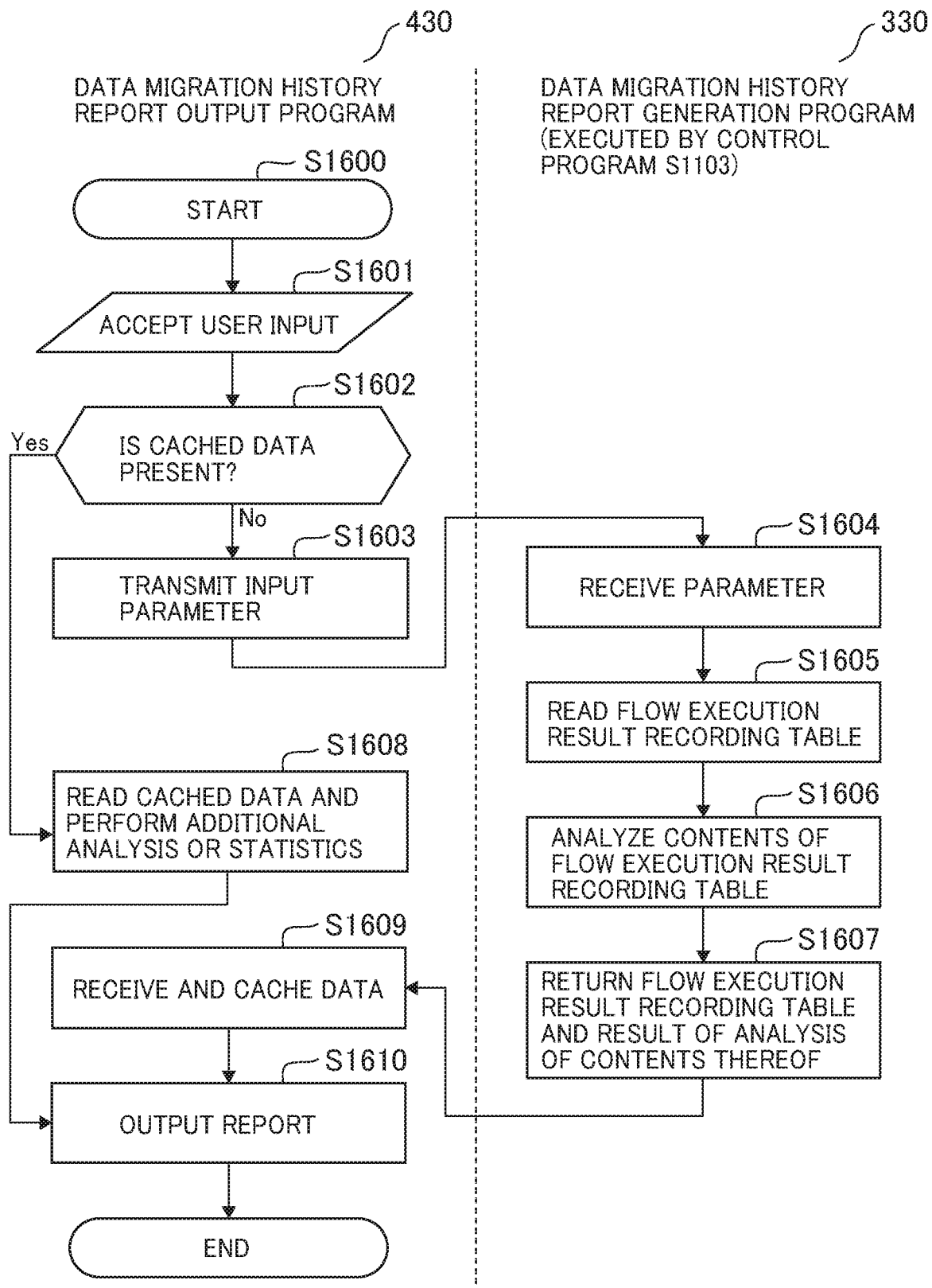
FIG. 23 is a flowchart of data migration history report generation and output processing according to an embodiment.

FIG. 23 is a flowchart of data migration history report generation and output processing according to an embodiment.

When the data migration history report output program 430 is executed by the CPU 210 of the terminal computer 101, data migration history report processing is started (S1600). The data migration history report output program 430 accepts an input from a user with respect to a period for which a report should be outputted, an output style, and an output format including whether all the logs should be attached (S1601).

Subsequently, the data migration history report output program 430 checks whether data corresponding to the contents inputted by the user (user input contents) has been already cached (S1602). When the data has not been cached (S1602: No), the program transmits the user input contents to the storage computer 102 to request to process the data (S1603). Meanwhile, when the data has been already cached (S1603: Yes), the program reads the cached data and performs summation required for report output or the like as required (S1608) and outputs a data migration history report 1500 in the formatted specified by user input (S1610).

When the control program 310 of the storage computer 102 receives the processing request from the terminal computer 101 at Step S1103 of the data migration control processing (FIG. 17), the control program starts execution of the data migration history report generation program 330 and the data migration history report generation program 330 receives all the user input contents (S1604).

Subsequently, the data migration history report generation program 330 reads data for a period whose range is specified by user input from the flow execution result recording table 387 (S1605). Subsequently, the program analyzes or summarizes the contents of the read data from the flow execution result recording table 387 and generates information required for outputting a report 1500 (S1606). The range of contents outputted to the data migration history report 1500 or the like is in accordance with specification by user input.

Subsequently, the data migration history report generation program 330 returns the read contents themselves of the flow execution result recording table 387 and information obtained by analysis or summation at Step S1606 to the terminal computer 101 for output as a log (S1607). Here, processing by the data migration history report generation program 330 on the storage computer 102 is completed.

The data migration history report output program 430 of the terminal computer 101 receives and caches the information returned at Step S1607 (S1609). Subsequently, the data migration history report output program 430 outputs the data migration history report 1500 in the format specified by user input (S1610).

Further, in the computer system according to this embodiment, specific contents of processing can be defined by operating a GUI screen on the terminal computer 102 to generate a flow. Such specific contents include from which signal generator a signal is received, what processing is performed, to which storage computer a result of processing is transmitted, and the like. Aside from the above-mentioned operation, the storage computer can be variously operated from the GUI screen on the terminal computer 102.

Figure 24:
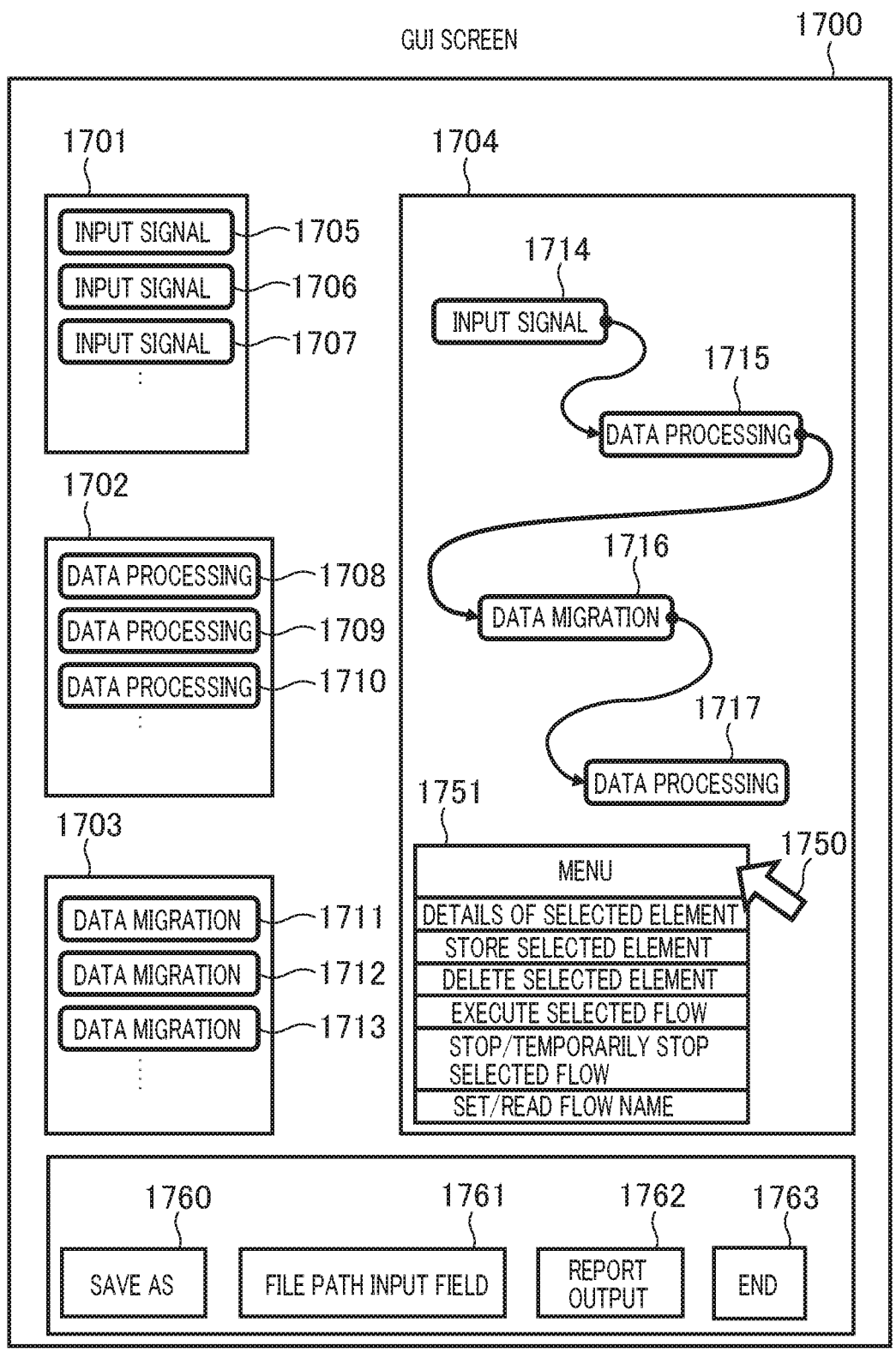
FIG. 24 is a drawing illustrating an exemplary GUI screen for generating a flow according to an embodiment.

FIG. 24 illustrates an example of a GUI screen for generating a flow according to an embodiment.

The GUI screen 1700 is displayed on the display 210 or the like by the user interface program 410.

The GUI screen 1700 includes an input signal node list 1701, a data processing node list 1702, a data migration node list 1703, a canvas 1704, a mouse cursor 1750, a pop-up menu 1751, a save as button 1760, a file path input field 1761, a report output button 1762, and an end button 1763.

The input signal node list 1701 is a list of nodes corresponding to each row of the input signal management table 381. Each node (1705 to 1707, and the like) in the list corresponds to a different data source (511 to 513), such as various signal generators. A user can add a step of inputting a data signal to a flow by operating the mouse cursor 1750 to select a node from the input signal node list 1701 and placing the node on the canvas 1704.

The data processing node list 1702 is a list of nodes corresponding to each row of the data processing content management tables 382 and 383. Each node (1708 to 1710, and the like) in the list corresponds to different data processing (531 to 533, and the like). A user can add a step of data processing to a flow by operating the mouse cursor 1750 to select a node from the data processing node list 1702 and placing the node on the canvas 1704.

The data migration node list 1703 is a list of nodes corresponding to each row of the compliance status management table 384. Each node (1711 to 1713, and the like) in the list corresponds to a different data migration pattern (611 to 613, and the like). A user can add a step of data migration to a flow by operating the mouse cursor 1750 to select a node from the data migration node list 1703 and placing the node on the canvas 1704.

The canvas 1704 is an area where a flow can be generated by a user operating the mouse cursor 1750 and arranging and combining selected nodes. Specifically, a user can click on the mouse cursor 1750 to select a node from the various node lists (1701, 1702, and 1703) and can drag a selected node to place the node in any position on the canvas 1704. Further, a user can drag a placed node to freely change a position of the node. When either of the left and right ends of a node on the canvas 1704 is clicked on and then either of the left and right ends of another node is clicked on, a link can be generated between the node and the node. When the link is generated, the node and the node are coupled together via a line on the GUI screen 1700. When an instruction to save is given in this state, the contents of the flow definition management table 385 and the flow management table 386 are updated to the contents corresponding to the flow on the canvas 1704. A link between nodes corresponds to contents of preceding node 705, subsequent node 706, and start node 734 in the flow definition management table 385 and the flow management table 386. The left end of each node means input and the right end of the node means output and a link is not completed when an input and an output are not coupled with each other. Inputs and outputs have a type defined in the input/output type table 391 and a link is not completed either when an output type and an input type do not agree with each other or in other like cases. A type of a node is obtained by referring to the columns of signal type 504, input type list 523, and output type list 524. When a link is not completed, link generation may simply fail or a problem may be alerted to, for example, by displaying a broken line to generate a temporary link.

The mouse cursor 1750 is an image displayed on the GUI screen 1700. The mouse cursor 1750 points to any place on the GUI screen 170 by a user moving the mouse 212 and allows a pointed object to be operated by clicking on a button provided in the mouse 212. A number of buttons provided in the mouse 212 is different depending on the type of the mouse 212. However, by clicking on a button while pressing any key on the keyboard 211, the same effect as a different button is pressed is brought above. That is, even though a number of physical buttons provided in the mouse differ, the operation of the GUI is not influenced. The mouse cursor 1750 can be operated by any other device than the mouse. The mouse cursor may be operated, for example, by a touch panel, a track ball, a device turning brain waves, a line of sights, or movement of a muscle into a signal, or the like.

The pop-up menu 1751 appears on the screen by clicking on any button provided in the mouse 212. By selecting one of the items listed in the displayed pop-up menu 1751, such an element as a node or a flow selected immediately before can be operated. Specifically, such operation as displaying the details of a selected element, saving a selected element, deleting a selected element, executing a selected flow, stopping a selected flow, temporally stopping or resuming a selected flow, inputting a name of a selected element, and reading a saved flow is implemented.

The SAVE AS button 1760 is a button for giving an instruction to save a flow on the canvas 1704 as a new flow. When the SAVE AS button 1760 is pressed, specifically, a flow on the canvas 1704 is saved in such a manner that a new row provided with a new ID is added to the flow definition management table 385 and the flow management table 386.

The FILE PATH INPUT field 1761 is a field for inputting a path (file path) to a file accessible to the terminal computer 101. Through a file path entered into the FILE PATH INPUT field 1761, the interior of a recording area in the terminal computer 101, the interior of an external storage device connected via USB, the interior of a shared folder on a remote sever accessible via a network, or the like can be referred to. By pressing an enter key or performing other like operations after entry of a file path into the FILE PATH INPUT field 1761, reading of the file corresponding to the inputted file path is started. The processing corresponding to this operation is equivalent to the processing of Step S1401 of the processing plug-in adding processing. That is, in processing caused by operation with the FILE PATH INPUT field 1761, a data processing program 340 and a related table can be added or updated or any other program or table can be added or updated.

The REPORT OUTPUT button 1762 is a button for instructing to output the data migration history report 1500. When the REPORT OUTPUT button 1762 is selected and clicked on, the data migration history report output program 430 is executed and the data migration history report 1500 is outputted.

The END button 1763 is a button accepting a request to terminate GUI or shut down the storage computer 102. When the END button 1763 is selected and clicked on, the user interface program 410 accepts a request to shut down the storage computer 102 and transmits the request to the storage computer 102. In the storage computer 102, the control program 310 receives the request (S1103), makes a determination (S1111), and then stops the storage computer 101 (S1112).

Operations with the GUI screen 1700 may all be replaced with those with a non-graphical interface, such as a command line, and may be replaced with those with any other graphical interface than described above.

Figure 25:
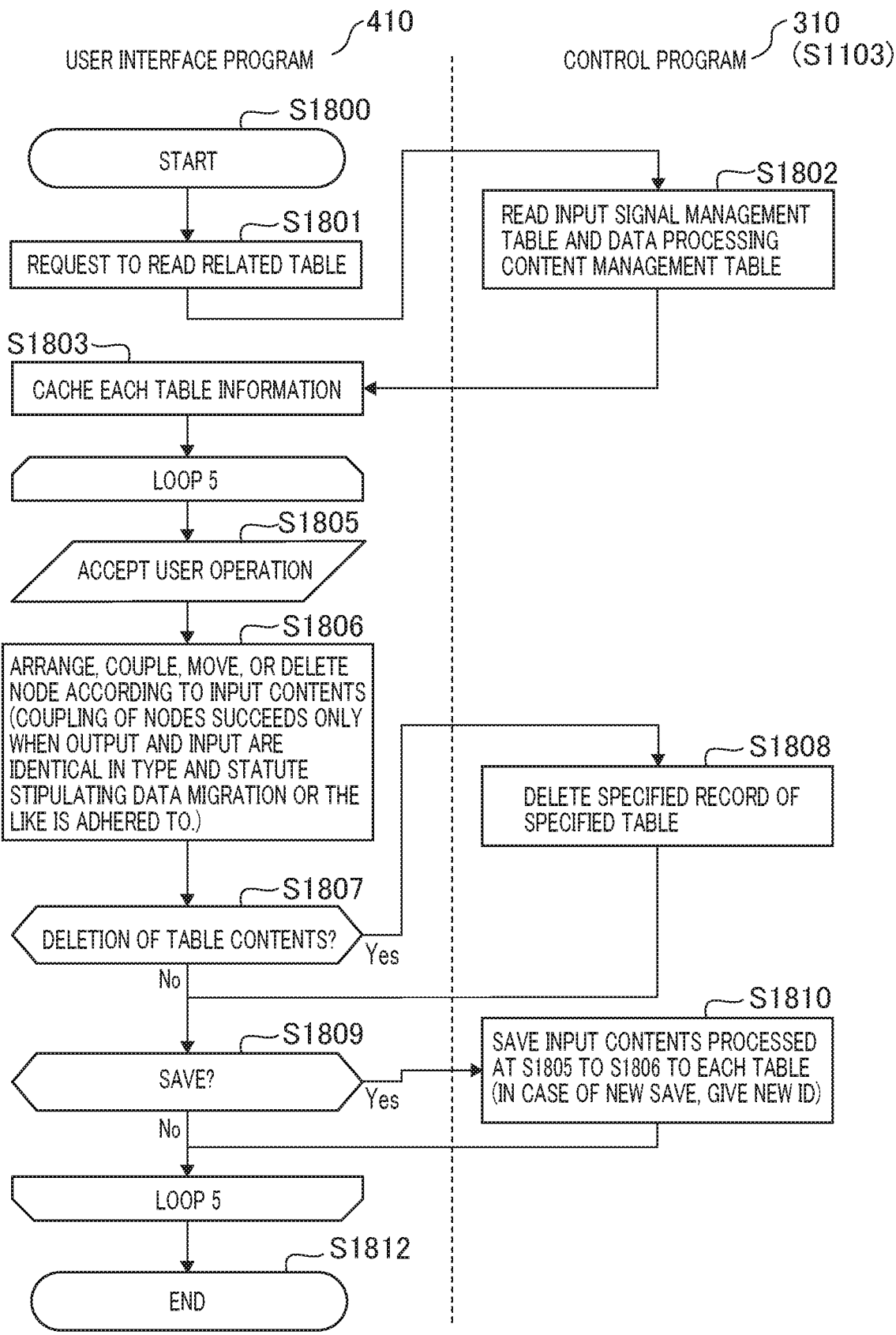
FIG. 25 is a flowchart of GUI display control processing according to an embodiment.

FIG. 25 is a flowchart of GUI display control processing according to an embodiment.

In the GUI display control processing, the user interface program 410 and the control program 310 perform processing in collaboration with each other.

When the user interface program 410 is executed at the terminal computer 101, the GUI display control processing is started (S1800).

The user interface program 410 transmits a request to read a table related to the processing to the storage computer 102 (S1801). In response, the control program 310 returns the requested table (S1802).

The user interface program 410 holds information of each returned table by such a method as saving to the cache area 480 (S1803). Specifically, the user interface program 410 acquires and holds tables, such as the input signal management table 381, the data processing content management table 382, the compliance status management table 384, the flow definition management table 385, the flow management table 386, and the input/output type table 391. The program acquires and holds other tables as well as required depending on a GUI implementation method.

Subsequently, the user interface program 410 performs processing (S1805 to S1809) of a main loop (loop 5). In processing of the main loop, the contents of the GUI screen 1700 including the mouse cursor 1750 and the like are updated each time a loop is executed.

First, the user interface program 410 accepts user input, such as clicking of a mouse button (S1805). Subsequently, the user interface program 410 performs various operations, such as arranging a node, checking a data type between nodes and coupling nodes together, moving a node, and deleting a node, according to the contents of the accepted input (S1806). Especially, with respect to data type check between nodes, the user interface program 410 checks whether a data type of an outputting node and a data type of an inputting node agree with each other by referring to the signal type 504, the input type list 523 and output type list 524, and the input/output type table 391 to identify the types. In case of disagreement, the program does not couple the nodes together and in cases of agreement, the program couples the nodes together. However, with respect to data migration nodes, it is also checked whether an output type of a node before data migration and an input type of a node after data migration agree with each other. In case of agreement, the program connects a data migration node between those nodes. Further, the user interface program 410 refers to the compliance status management table 384 to check whether export permissibility 605 is "OK" or not. When export permissibility 605 is "OK," the program couples nodes together. Thus, also with respect to nodes that are not directly linked with each other, the program performs type check or the like and couples the nodes together only when no problem is involved.

When deletion of table contents is instructed (S1807: Yes), the user interface program 410 subsequently specifies ID of a row to be deleted to request the storage computer 102 to delete the table contents (S1807). On reception of the request, the control program 310 identifies a specified row of a specified table by ID and deletes the row (S1808).

When saving a flow or a node is instructed (S1809: Yes), the user interface program 410 specifies ID for overwrite saving and does not specify ID for new saving and requests the storage computer 102 to perform saving processing (S1809). On reception of the request, the control program 310 saves input contents of a flow or the like generated at the steps (S1805 to S1806) up to this point to a predetermined table (S1810). In case of updating of existing contents, the control program 310 overwrites a corresponding row and in case of addition of a new element, the program gives and saves a new ID to a new row. Other operations are also similarly implemented in collaboration with the control program 310. Here, the processing of Steps S1802, S1808, and S1810 performed by the control program 310 is processing performed at Step S1103 of the data migration control processing (FIG. 17).

The user interface program 410 repeatedly performs the above-mentioned processing of loop 5 until the END button 1763 is pressed on the GUI screen 1700. When the END button 1763 is pressed, the program exits from loop 5 and terminates the GUI display control processing (S1812).

Figure 26:
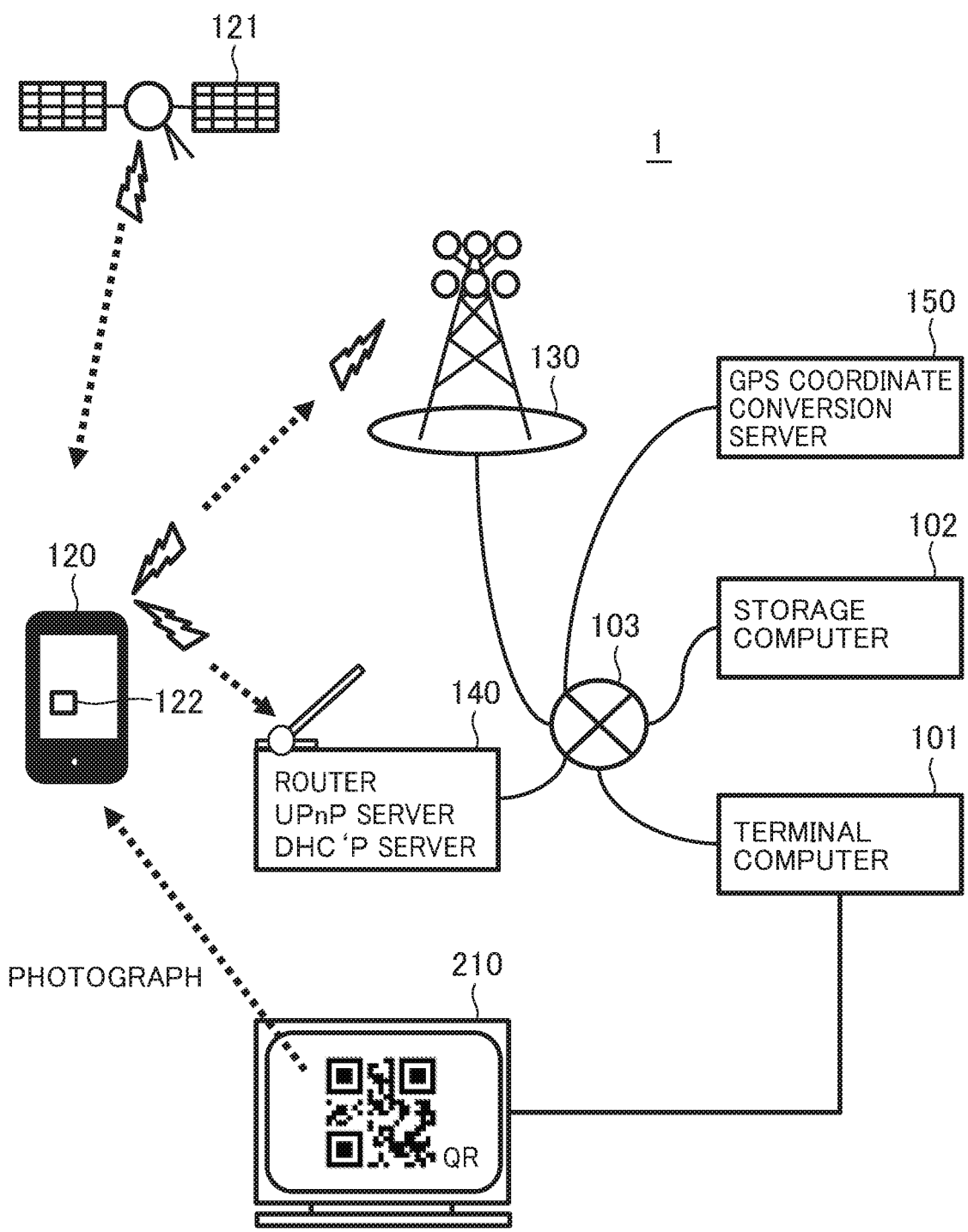
FIG. 26 is a drawing illustrating an exemplary configuration related to initial setting of a computer system according to an embodiment.

FIG. 26 illustrates an example of a configuration related to initial setting of a computer system according to an embodiment.

Initial setting cited here is, for example, to set contents of the basic setting table 388. Initial setting is made mainly using the terminal computer 101 and the mobile terminal 120. The mobile terminal 120 has a function of receiving a radio wave or the like from a satellite 121 to acquire GPS coordinates indicating the present position of the mobile terminal 120. Further, the mobile terminal 120 is provided with a camera. The mobile terminal 120 can acquire any information from the terminal computer 101 by using the camera to photograph such a pattern as QR code (registered trademark) displayed on the display 210 connected to the terminal computer 101. That is, the mobile terminal 120 can acquire information even from a terminal computer 101 for which network setting has not been completed. A mobile terminal application 122 can be installed in the mobile terminal 120. The mobile terminal 120 can acquire the mobile terminal application 122 by downloading from an application distribution site or the like and the application can be performed, for example, by clicking on an icon displayed on the screen of the mobile terminal 120.

The terminal computer 101 and the storage computer 102 are connected with each other via a network 103. Further, a base station 130, a router 140, a GPS coordinate conversion server 150, and the like are connected to the network 103.

The base station 130 connects the mobile terminal 120 to the network 103 by communicating a radio wave between the base station and the mobile terminal 120.

The router 140 has a server function of DHCP (Dynamic Host Configuration Protocol), UPnP (Universal Plug and Play), and the like and is capable of distributing information, such as IP address, related to network setting required for communication to other equipment. As a result, the terminal computer 101 and the storage computer 102 can obtain temporary initial values related to network setting and can use the obtained initial values to perform communication to update the contents of the basic setting table 388. Alternatively, the storage computer 102 can save the obtained initial values to the basic setting table 388 without any change.

The GPS coordinate conversion server 150 provides a function of converting GPS coordinates into a name of a country or a regional name corresponding to the GPS coordinates. With the name of a country or the regional name, a statute applied to a relevant region can be identified. Therefore, with GPS coordinates, a statute established in a region identified by the GPS coordinates can be identified. A function of the GPS coordinate conversion server 150 may be implemented by making the terminal computer 101 and the storage computer 102 collaborate with each other. Specifically, a function of the GPS coordinate conversion server may be implemented through collaboration between the initialization program 440 and the control program 310. Implementation of this function with the GPS coordinate conversion server 150 brings about advantages that the GPS coordinates of multiple storage computers 102 can be consolidated to facilitate centralized management and that a specific fixed access destination (fixed IP address set on the GPS coordinate conversion server 150 or the like) can be provided to the mobile terminal 120.

Figure 27:
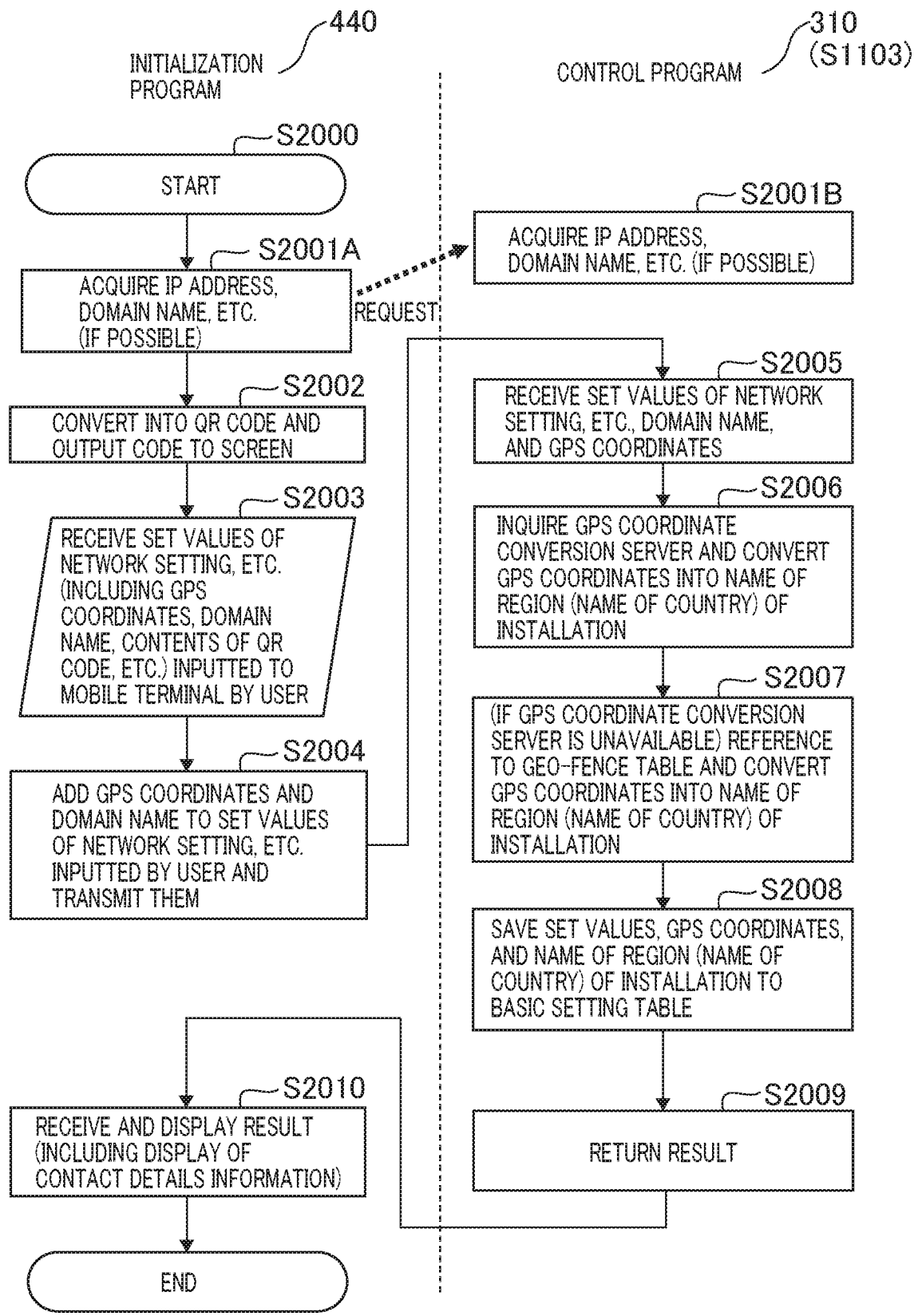
FIG. 27 is a flowchart of processing performed between a terminal computer and a storage computer in initialization processing according to an embodiment.

FIG. 27 is a flowchart of processing that takes place between a terminal computer and a storage computer in initialization processing according to an embodiment.

When the initialization program 440 is executed at the terminal computer 101, the initialization processing is started (S2000). First, the initialization program 440 acquires acquirable network setting, such as an IP address and a domain name, from such a device as the router 140 and establishes the setting as provisional values (S2001A). For the provisional values, values written to the basic setting table 388 in advance may be directly used or values read and acquired from such an external recording medium as a USB memory may be used. The initialization program 440 may request the control program 310 to acquire network setting and establish provisional values on the storage computer 102 side (S2001B). Provisional values of the storage computer 102 may be confirmed from the terminal computer 101 using a shared folder or the like.

Subsequently, the initialization program 440 converts such information as an IP address and a domain name into such imaged information as a QR code and displays the imaged information on the display 210 (S2002). Aside from the IP addresses of the terminal computer 101 and the storage computer 102 acquired at Step S2001A, a predetermined IP address of the GPS coordinate conversion server 150 may be added to IP addresses to be converted into a QR code.

The mobile terminal 120 photographs the QR code by user operation to acquire such information as an IP address and a domain name. Instead of photographing, information that has not been converted into a QR code may be directly acquired from the terminal computer 101 by directly connecting with a USB cable or network accessing via the router 140, depending on a type of the mobile terminal 120. Subsequently, the mobile terminal 120 accepts additional input of an item set in the basic setting table 388 and consolidates the information obtained from the photographed QR code and the additionally inputted information. The mobile terminal adds the consolidated information to a payload of a packet (Refer to FIG. 29) and transmits the packet to the terminal computer 101.

The initialization program 440 receives the packet transmitted from the mobile terminal 120 and acquires the contents of the payload (S2003). A detailed description will be given to the composition of the payload later. Various methods can be utilized according to network environments with respect to a route through which the mobile terminal 120 transmits a packet to the terminal computer 101. Such methods include: a method of accessing via the base station 130 with use of a global IP address of the terminal computer 101; a method of accessing via the router 140 with use of a private IP address; a method in which a packet is transmitted from the mobile terminal 120 to the GPS coordinate conversion server 150 and the packet received by the GPS coordinate conversion server 150 is acquired by polling on the terminal computer 101 side; and the like.

The initialization program 440 transmits setting values of network setting and the like contained in the payload acquired from the terminal computer 101 to the storage computer 102 (S2004)

The control program 310 performs the processing of the subsequent Steps S2005 to S2009 in the processing of Step S1103 of the data migration control processing (FIG. 17).

Specifically, the control program 310 receives the information transmitted from the terminal computer 101 (S2005).

Subsequently, the control program 310 utilizes the GPS coordinate conversion server 150 to convert GPS coordinates into a regional name (a name of a country) (S2006). Specifically, the control program 310 transmits the GPS coordinates sent from the terminal computer 101 to the GPS coordinate conversion server 150. The GPS coordinate conversion server 150 uses the geo-fence/domain management table 393 to convert the GPS coordinates into a regional name (a name of a country) and returns the regional name to the storage computer 102. A detailed description will be given to conversion of GPS coordinates later.

When the GPS coordinate conversion server 150 is unavailable, when connection to the GPS coordinate conversion server 150 cannot be established, or in other like cases, the control program 310 uses the geo-fence/domain management table 393 held in the storage computer 102 to convert the GPS coordinates into a regional name (a name of a country) (S2007). A detailed description will be given to conversion of GPS coordinates later. Since GPS coordinates can be converted into a regional name by Step S2007, Step S2006 may be omitted. The processing of the GPS coordinate conversion server 150 is implemented just by remotely performing the processing of Step S2007. However, initialization of multiple storage computers 102 at the GPS coordinate conversion server 150 brings about an advantage that supplementary information, such as an IP address allocated to each storage computer 102, can be easily and centralizedly managed with the geo-fence/domain management table 393 at one location and other like advantages.

The control program 310 saves the regional name (name of a country) obtained by conversion of the GPS coordinates and other information sent from the terminal computer 101 to the basic setting table 388 (S2008) and returns a processing result to the terminal computer 101 (S2009). When a regional name (a name of a country) is not determined, the control program 310 takes an error as a processing result, adds contact details for inquiring about regional name (name of a country) as supplementary information (error status), and returns the processing result to the terminal computer 101.

The initialization program 440 of the terminal computer 101 receives and displays the processing result and terminates the processing (S2010). When the processing result is error, the initialization program 440 also displays supplementary information (error status) including a reason of the error, contact details for inquiring about regional name (name of a country), and the like.

Figure 28:
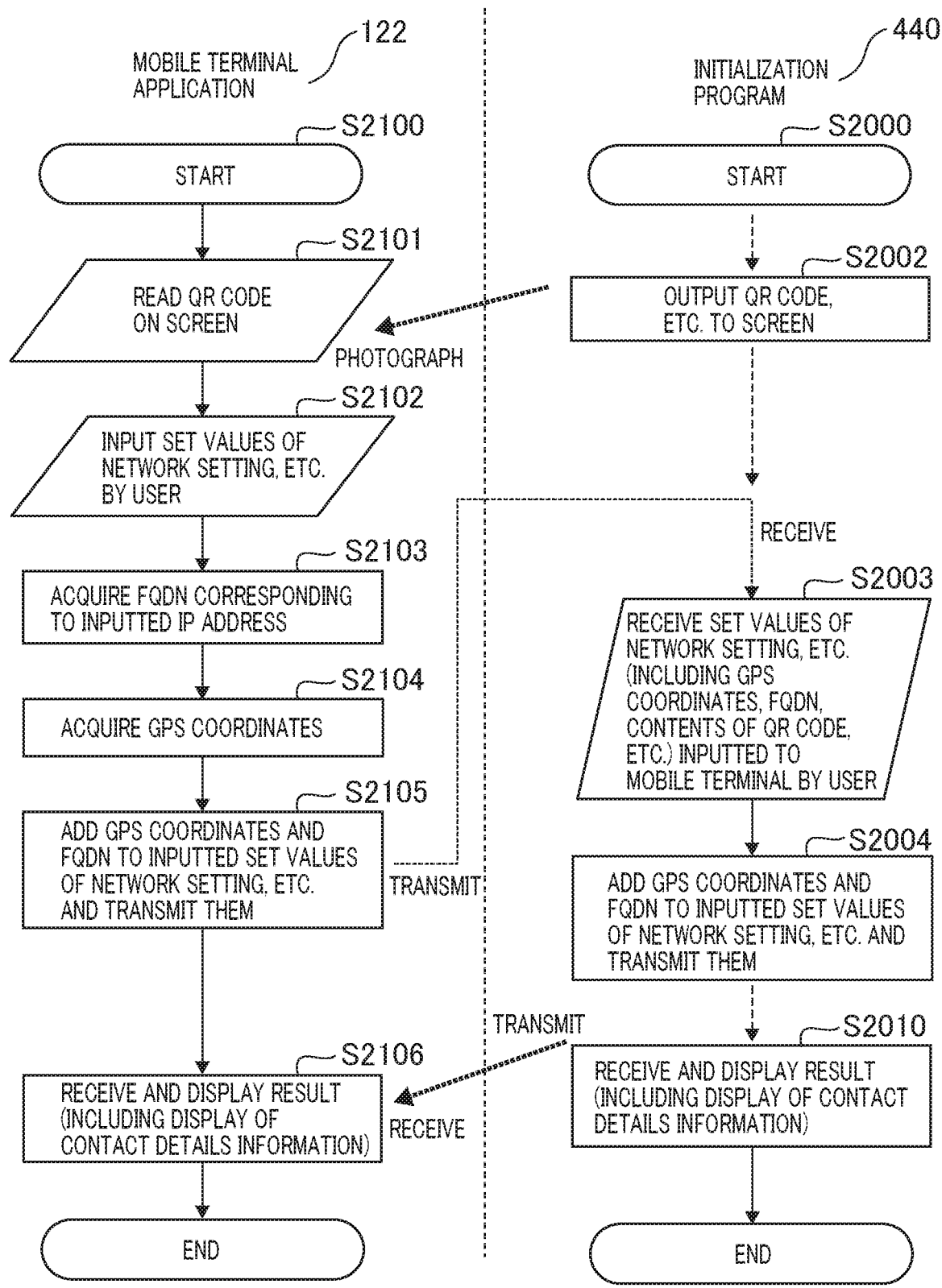
FIG. 28 is a flowchart of processing performed between a mobile terminal and a terminal computer in initialization processing according to an embodiment.

FIG. 28 is a flowchart of processing that takes place between a mobile terminal and a terminal computer in initialization processing according to an embodiment.

The mobile terminal application 122 of the mobile terminal 120 runs in collaboration with the initialization program 440.

When the mobile terminal application 122 is executed at the mobile terminal 120, the initialization processing is started (S2100). At this time, the initialization program 440 of the terminal computer 101 is also executed (corresponding to Step S2000).

After execution of Step S2002 by the initialization program 440, the mobile terminal application 122 of the mobile terminal 120 photographs a QR code displayed on the display 210 of the terminal computer 101 with a camera provided in the mobile terminal 120 by user operation and reads information converted into this QR code (S2101).

Subsequently, the mobile terminal application 122 accepts information to be set on the basic setting table 388 by user input with a touch panel or the like of the mobile terminal 120 (S2102). The mobile terminal application 122 accepts an appendix or a correction to network information, such as a host name, an IP address, a default gateway, and a DNS server, by manual user input. An IP address acquired from the QR code is a provisional value and the user can correct this value to a value finally set in the basic setting table 388 by the processing of this step as required.

Subsequently, the mobile terminal application 122 acquires a domain name and FQDN corresponding to an IP address set in the basic setting table 388 (S2103). A domain name and FQDN can be acquired from a DNS server open to the public on the Internet. Subsequently, the mobile terminal application 122 uses a radio wave from a satellite 121 to acquire GPS coordinates (S2104).

Subsequently, the mobile terminal application 122 transmits a packet with the network setting and the like accepted at Steps S2101 and S2102 and the acquired GPS coordinates and FQDN (domain name) added to the payload of the packet to the terminal computer 101 (S2105). Packet transmission methods include: a method in which a global IP address of the terminal computer 101 acquired through a QR code is used; and a method in which a packet transmitted to the GPS coordinate conversion server 150 is acquired by the terminal computer 101.

When the mobile terminal application 122 thereafter receives a result of processing of up to Steps S2003 to S2010 of the initialization program 440, the application displays the processing result and terminates the program (S2106).

Figure 29:
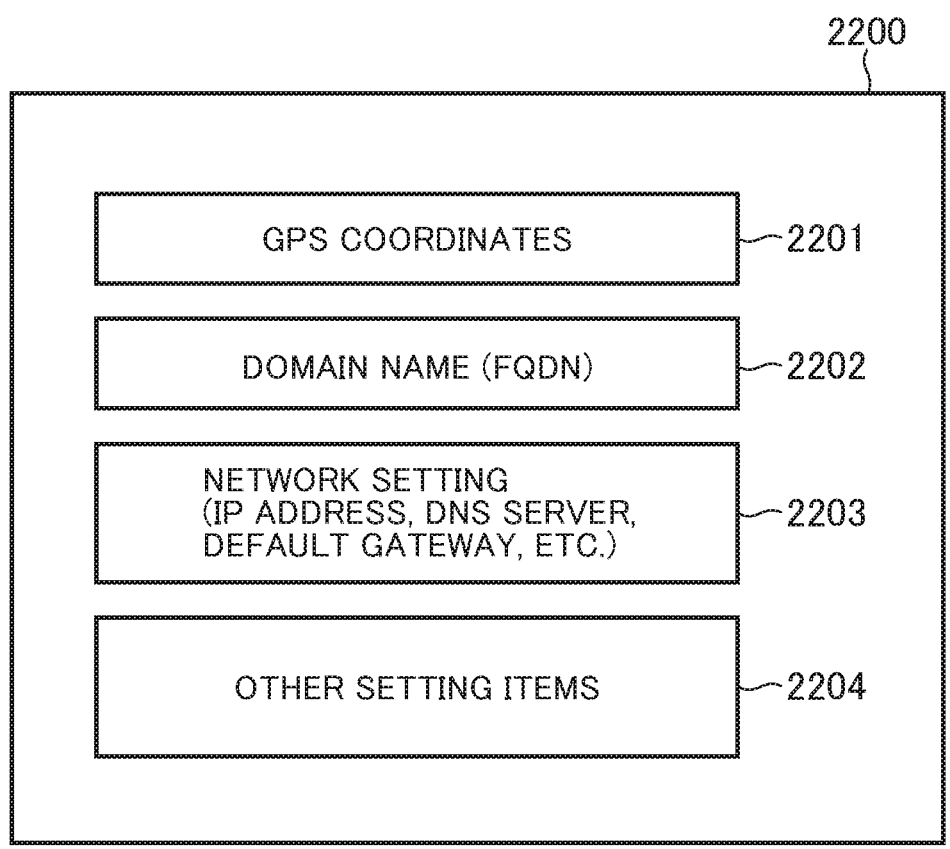
FIG. 29 is a drawing illustrating a payload of a transmission packet according to an embodiment.

FIG. 29 illustrates a payload of a transmission packet according to an embodiment.

The payload 2200 includes portions of GPS coordinates 2201, domain name (FQDN) 2202, network setting 2203, and other setting items 2204. In the portion of GPS coordinates 2201, the GPS coordinates of a position of the mobile terminal 120 are placed. In the portion of domain name (FQDN) 2202, a domain name (FQDN) is placed. In the portion of network setting 2203, an IP address, a DNS server, a default gateway, and the like are contained. In the portion of other setting items 2204, any information to be set in the basic setting table 388 is placed.

FIG. 30 is a detailed composition diagram of a geo-fence/domain management table according to an embodiment.

The geo-fence/domain management table 393 is a table holding a rule for conversion from GPS coordinates to a regional name (a name of a country) or conversion from a domain name (FQDN) to a regional name (a name of a country).

The items of columns of the geo-fence/domain management table 393 include ID 2301, geo-fence/domain 2302, regional name/country name 2303, priority 2304, allocated address 2305, and other supplementary information 2306.

In the column of ID 2301, an identifier for identifying each row is placed. In the column of geo-fence/domain 2302, at least either of a geo-fence and a domain name is placed. Geo-fence cited here refers to a list of multiple GPS coordinates and indicates a range encircled with these GPS coordinates. A wildcard matching with any character string may be included in domain names.

In the column of regional name (country name) 2303, a name of a region or a name of a country constituting a boundary of a statute corresponding to a geo-fence or a domain in the column of geo-fence/domain 2302 in an identical row and such an identifier as an ISO code thereof is placed.

Here, a description will be given to a reason why two different types, physical space (geo-fence) and name space (domain name), are used. A statute to adhere to differs by physical region or country that can be defined by a geo-fence. However, an applied statute may differ by private enterprise, local public body, such as private university, national university, and local public university, or national institution, such as National Research Institute of Police Science, or the like. For this reason, a name of a facility or an organ associated to a statute to comply with is included in regional name (country name) 2303. Further, data migration to a server of a foreign-owned enterprise or the like located in Japan may also be handled as export. Consequently, identification based on a name space is used together with geographical identification.

In this embodiment, conversion into a regional name (a name of a country) is implemented by: listing rows in the descending order of priority from the head of the geo-fence/domain management table 393; sequentially searching for a row to which geo-fence/domain 2302 is applicable from the head of the table; and outputting a regional name (a name of a country) in the column of regional name (country name) 2303 of a found row.

In the column of priority 2304, a priority of each row is placed. This example indicates that a smaller value is equivalent to a higher priority. When multiple rows identical in value of geo-fence/domain 2302 are present in a geo-fence or a domain to be converted, one row can be identified by selecting a row having the highest priority. Any other method, for example, a method of arranging rows in the table in the order of strictness of condition of rule, may be combined to select a regional name (a name of a country) having a higher priority.

In the column of allocated address 2305, a list of IP addresses of storage computers 102 to which a rule of a row was applied in the past is placed. When an IP address of a target device in conversion into a regional name (a name of a country) is placed in the column of allocated address 2305 in advance, as mentioned above, an IP address can be utilized to inversely search for a regional name (a name of a country) or for other like purposes.

In the column of supplementary information 2306, supplementary information, such as information on an organization corresponding to an IP address or a domain name of a storage computer to which a rule of a row was applied in the past, is placed. When an enterprise changes nationality to which the enterprise belongs or a statute is revised, whether any device requires updating or not can be confirmed from information in the column of supplementary information 2306. By using an IP address registered in the column of allocated address 2305, a storage computer can be notified of an update and updating be performed.

The row 2311 indicates a rule that in case of agreement both with a domain name "*.xyz.go.jp" and with an area (geo-fence: (53.002, 14.311)) encircled with multiple GPS coordinates, conversion into "administrative organ of Japan" should be performed. The row 2311 indicates an already allocated address (20.2.3.*) and supplementary information (xyz (administrative organ)).

The row 2312 indicates a rule that in case of agreement with a domain name "*.abcd.co.jp," conversion into "Japan" should be performed. The row 2312 indicates an already allocated address (10.2.5.*) and supplementary information (abcd corporation (Japanese branch office)).

The rows 2313 and 2314 indicate a rule that in case of agreement with a geo-fence (53.002, 14.311) or (52.001, 13.310), conversion into "EU: Germany" should be performed. The rows 2313 and 2314 indicate that multiple allocated addresses (10.0.0.1, 10.0.1.2) and multiple pieces of supplementary information (storage device A, storage device B) are present.

The row 2315 indicates an example of the last row adopted when agreement with any row is not present. In the row 2315, geo-fence/domain 2302 is exceptionally "others," and contact details information is placed as supplementary information. When such a row as row 2315 is placed as a row having a rule with the lowest priority, error processing can be implemented when any other row than row 2315 is not applicable and conversion into a regional name (a name of a country) cannot be performed. Specifically, in case of an occurrence of an error, contact details information placed in the column of supplementary information can be added to a processing result when the processing result is returned. Contact details information is displayed at Step S2106 of FIG. 28 by the mobile terminal application 122 and an inquiry about a regional name (a name of a country) into which automatic conversion could not be performed can be made and a regional name (a name of a country) can be manually set. As contact details, any information, such as phone number, mail address, and Web site address, can be set.

The present invention is not limited to the above-mentioned embodiment and can be modified without departing from the subject matter of the present invention as appropriate.

Some examples will be taken. In the above-mentioned embodiment, permissibility of data transfer is determined based on: information related to a statute contained in input data; processing contents of processing before data transfer; a processing result of processing before data transfer; processing contents of processing after data transfer; a processing result of processing after data transfer; and a compliance status with respect to a statute. The present invention is not limited to this and permissibility of data transfer may be determined based on at least any one type of information.

The description of the above embodiment takes an example in which data migration between regions different in predominantly applied statute, that is, export of data is to be managed. The present invention is not limited to this and is also applicable to data migration between environments different in rule and data migration from an environment where some rule is present to the outside. For example, in case of data migration between environments different in rule, the above-mentioned statute or the like only has to be replaced with a rule.

Part or all of processing performed by CPU in the above-mentioned embodiment may be performed by a hardware circuit. A program in the above-mentioned embodiment may be installed from a program source. The program source may be a program distribution server or a storage medium (for example, a portable storage medium).

What is claimed is:

1. A data transfer management system managing transfer of data from a transfer source belonging to an environment where handling of data is regulated to an external transfer destination,
wherein data to be transferred is sequential transfer data sequentially transferred to the external transfer destination when the data is not wholly present in the environment,
the data transfer management system comprising:
a storage portion storing information; and
a processor portion connected to the storage portion and capable of performing predetermined processing,
wherein the processor portion
determines permissibility of transfer of the data to be transferred to the transfer destination based on personal information included in a data source on which the data to be transferred is based, contents of processing performed on the data source, an execution result of the processing on the data source,
provides an identifier for each piece of personal information based on information stored in the storage portion,
determines, for each piece of personal information, if the identifier is blocked or passed,
on a condition that the identifier is blocked, the processing deletes a section of information and prevents the section from continuing to a next step in the processing,
on a condition that the identifier is passed, the personal information is sent to the next step of the processing,
performs additional processing a predetermined number of times,
reviews a status for each of the additional processing and determines a value for each of the statuses, and
determines, based on the value, if the data is transferable.

2. The data transfer management system according to claim 1,
wherein the storage portion stores compliance status management information indicating a status of compliance required for adhering to a rule related to transfer of data including personal information from the transfer source to the transfer destination, and
wherein the processor portion determines permissibility of transfer of the data to be transferred based on personal information included in a data source on which the data to be transferred is based, contents of processing performed on the data source, an execution result of the processing on the data source, and the compliance status management information.

3. The data transfer management system according to claim 1,
wherein the processor determines permissibility of transfer of the data to be transferred with contents of processing on the data to be transferred at the transfer destination further included.

4. The data transfer management system according to claim 1,
wherein a status of compliance required for adhering to a rule related to transfer of data including personal information to the transfer destination includes a status of compliance required at the transfer source and a status of compliance required at the transfer destination.

5. The data transfer management system according to claim 1, wherein the processor stores a log of processing of transfer of the data to be transferred to the transfer destination.

6. The data transfer management system according to claim 1, comprising:
a transfer management device including the storage portion and the processor portion;
a terminal computer communicatively connected with the transfer management device; and
a mobile terminal capable of picking up an image and further capable of acquiring GPS coordinates of the mobile terminal itself,
wherein the terminal computer displays an image including network setting information of the transfer management device,
wherein the mobile terminal:
picks up the image and acquires network setting information included in the image;
is capable of accepting a user's correction to the network setting information; and
transmits the network setting information that was corrected by a user or the network setting information that was not corrected by a user and the GPS coordinates of the mobile terminal itself to the terminal computer,
wherein the terminal computer:
identifies an environment to which the transfer management device belongs based on the network setting information and the GPS coordinates received from the mobile terminal, and sets the identified environment as an environment of the transfer source on the transfer management device, and wherein the transfer management device determines permissibility of transfer of the data to be transferred from the set transfer source.

7. A data transfer management method by a data transfer management system managing transfer of data from a transfer source belonging to an environment where handling of data is regulated to an external transfer destination, wherein data to be transferred is sequential transfer data sequentially transferred to the external transfer destination when the data is not wholly present in the environment, the method comprising:

determining permissibility of transfer of the data to be transferred based on personal information included in a data source on which the data to be transferred is based, contents of processing performed on the data source, and an execution result of the processing on the data source providing an identifier for each piece of personal information based on information stored in the storage portion;

determining, for each piece of personal information, if the identifier is blocked or passed, on a condition that the identifier is blocked, the processing deletes a section of information and prevents the section from continuing to a next step in the processing, on a condition that the identifier is passed, the personal information is sent to the next step of the processing;

performing additional processing a predetermined number of times;

reviewing a status for each of the additional processing and determines a value for each of the statuses; and determining, based on the value, if the data is transferable.

8. The data transfer management system according to claim 1, wherein the identifier categorizes a problem with the personal information.

9. The data transfer management system according to claim 8, wherein both the blocked identifier and the passed identifier contain the problem.

10. The data transfer management system according to claim 9, wherein the blocked identifier, included in one of the pieces of personal information, is transferable.

\* \* \* \* \*